United States Patent
Rajamanickam et al.

(10) Patent No.: US 12,184,534 B2
(45) Date of Patent: Dec. 31, 2024

(54) MONITORING PRIMARY AND LOCAL REPAIR PATHS ON ALL HOPS BETWEEN TWO NODES

(71) Applicant: Cisco Technology, Inc., San Jose, CA (US)

(72) Inventors: Jaganbabu Rajamanickam, Kanata (CA); Madhan Sankaranarayanan, Tamil Nadu (IN); Nagendra Kumar Nainar, Morrisville, NC (US); Rakesh Gandhi, Stittsville (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/504,840

(22) Filed: Nov. 8, 2023

(65) Prior Publication Data
US 2024/0205131 A1 Jun. 20, 2024

(51) Int. Cl.
*H04L 45/02* (2022.01)
*H04L 45/00* (2022.01)
*H04L 45/28* (2022.01)

(52) U.S. Cl.
CPC .............. *H04L 45/02* (2013.01); *H04L 45/20* (2013.01); *H04L 45/28* (2013.01)

(58) Field of Classification Search
None
See application file for complete search history.

(56) References Cited

U.S. PATENT DOCUMENTS

| | | | | |
|---|---|---|---|---|
| 8,861,340 | B1* | 10/2014 | Atlas | H04L 45/128 370/227 |
| 2012/0218884 | A1* | 8/2012 | Kini | H04L 45/507 370/228 |
| 2015/0071055 | A1* | 3/2015 | Csaszar | H04L 45/28 370/217 |

(Continued)

FOREIGN PATENT DOCUMENTS

WO 2022140031 6/2022

OTHER PUBLICATIONS

International Search Report and Written Opinion for International Application No. PCT/US2023/083817, mailed Apr. 3, 2024, 10 Pages.

(Continued)

*Primary Examiner* — Fadi Haj Said
(74) *Attorney, Agent, or Firm* — Polsinelli P.C.

(57) ABSTRACT

In one aspect, a method for monitoring a Fast Re-Route (FRR) path between a source node (Node-S) and a destination node (Node-E) in a network, includes generating a discovery-probe at the source node (Node-S) to detect at least one node with an FRR indicator along the FRR path that includes a plurality of next available nodes. The method also includes upon the discovery probe reaching a first node with the FRR indicator, generating a primary probe configured to detect a primary path and a repair probe configured to detect a repair path. The method also includes in response to receiving the primary probe via the primary path and the repair probe via the repair path at the destination node, sending the primary probe and the repair probe back to the source node to monitor the FRR path between the source node and the destination node.

17 Claims, 19 Drawing Sheets

(56) References Cited

U.S. PATENT DOCUMENTS

2015/0304214 A1* 10/2015 Ye .................... H04L 45/507
                                                    370/392
2017/0353382 A1* 12/2017 Gupta ............... H04L 12/1886
2022/0210048 A1*  6/2022 Dutta ................. H04L 45/50
2022/0337516 A1  10/2022 Hasan et al.
2023/0261980 A1*  8/2023 Padi .................. H04L 43/0882
                                                    370/225

OTHER PUBLICATIONS

Motiwala M., "An Architecture for Network Path Selection", UMI Dissertation Publishing, May 1, 2012, 166 Pages, XP055411663, section 4.3.3 on pp. 86-90.

* cited by examiner

```
 0                   1                   2                   3
 0 1 2 3 4 5 6 7 0 1 2 3 4 5 6 7 0 1 2 3 4 5 6 7 0 1 2 3 4 5 6 7
+-+-+-+-+-+-+-+-+-+-+-+-+-+-+-+-+-+-+-+-+-+-+-+-+-+-+-+-+-+-+-+-+
|                  MPLS Label                  |  TC   |0|  TTL  |
+-+-+-+-+-+-+-+-+-+-+-+-+-+-+-+-+-+-+-+-+-+-+-+-+-+-+-+-+-+-+-+-+
|           MNA-Label = bSPL (TBA)             |  TC   |0|  TTL  |
+-+-+-+-+-+-+-+-+-+-+-+-+-+-+-+-+-+-+-+-+-+-+-+-+-+-+-+-+-+-+-+-+
| Opcode=2      |       0x00            |1| HBH |1| Res |U| NASL=0 |
+-+-+-+-+-+-+-+-+-+-+-+-+-+-+-+-+-+-+-+-+-+-+-+-+-+-+-+-+-+-+-+-+
|0 0 1 0 | 0x01 |  PS-MNA-LEN=1         |   TYPE = POST-STACK-MNA |
+-+-+-+-+-+-+-+-+-+-+-+-+-+-+-+-+-+-+-+-+-+-+-+-+-+-+-+-+-+-+-+-+
|  PS-MNA-OP=M  |   Start-DIS(TTL)      |   FRR-Noda-Count  |  PS  |
+-+-+-+-+-+-+-+-+-+-+-+-+-+-+-+-+-+-+-+-+-+-+-+-+-+-+-+-+-+-+-+-+
                                                            PS-NAL=0
+-+-+-+-+-+-+-+-+-+-+-+-+-+-+-+-+-+-+-+-+-+-+-+-+-+-+-+-+-+-+-+-+
~                OAM/BFD/PM/PT/iOAM Packet                       ~
~                                                                ~
+-+-+-+-+-+-+-+-+-+-+-+-+-+-+-+-+-+-+-+-+-+-+-+-+-+-+-+-+-+-+-+-+

PSD MNA Header for FRR path Traversing and Discovering (Continuous)
```

FIG. 9A

MONITORING PRIMARY AND LOCAL REPAIR PATHS ON ALL HOPS BETWEEN TWO NODES

CROSS-REFERENCE TO RELATED APPLICATIONS

This application claims the benefit of priority from Indian Provisional Patent Application No. 202221072144, filed Dec. 14, 2022, and Indian Provisional Patent Application No. 202341055817, filed Aug. 21, 2023, each of which is incorporated herein by reference in its entirety.

FIELD OF THE TECHNOLOGY

The present technology relates to the field of network communication and routing technologies, specifically addressing traffic engineering and segment routing. More particularly, the proposed technology encompasses methods for enhancing network reliability and efficiency by incorporating end-to-end monitoring mechanisms for the dynamic discovery and utilization of repair paths between nodes in a network.

BACKGROUND

Routing including Traffic engineering and Segment Routing provides an innovative approach to proactively monitor networks and route data packets more efficiently. It leverages advanced monitoring techniques, such as Multi-hop BFD, Seamless BFD (SBFD), Multi-Hop Performance Measurement (PM), Path MTU discovery, and path-tracing (PT) to closely track the performance metrics and status of network paths. This real-time analysis facilitates the timely detection of anomalies, faults, or degradation in the network. Routing including Traffic Engineering and Segment Routing are also capable of monitoring multiple repair paths and different types of repair paths over complex networks that span across multiple administrative domains.

Current technologies such as Multi-hop BFD, SBFD, Multi-Hop PM, Path MTU discovery, path-tracing etc., use the existing data plane to monitor a path between a source node (Node-S) and destination node (Node-D). Parameters monitored can include liveliness, connectivity verification, network parameters including delay and loss, Maximum Transmission Unit (MTU) discovery, etc. But these technologies will monitor only the active data paths (i.e., paths in which the data plane is allowed to forward the packets) (also called primary path). In the case of repair path, often referred to as a backup path or bypass path, the data traffic is allowed to be sent only when there is a failure, so in the steady state the repair path is not considered an active path. The above technologies cannot steer the traffic to primary/repair paths as needed on Point of Local Repair (PLR) as midpoints for example. This makes it difficult to monitor the status of multiple repair paths or multiple types of repair paths between Node-S and Node-D. Also, it is difficult to monitor the repair paths that cross multiple administrative domains.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 9A illustrates an example Post-Stack Data (PSD) MNA header for FRR path traversing and discovery in continuous mode for post-stack data (PSD) according to some aspects of the present technology;

DETAILED DESCRIPTION

Figure 1:
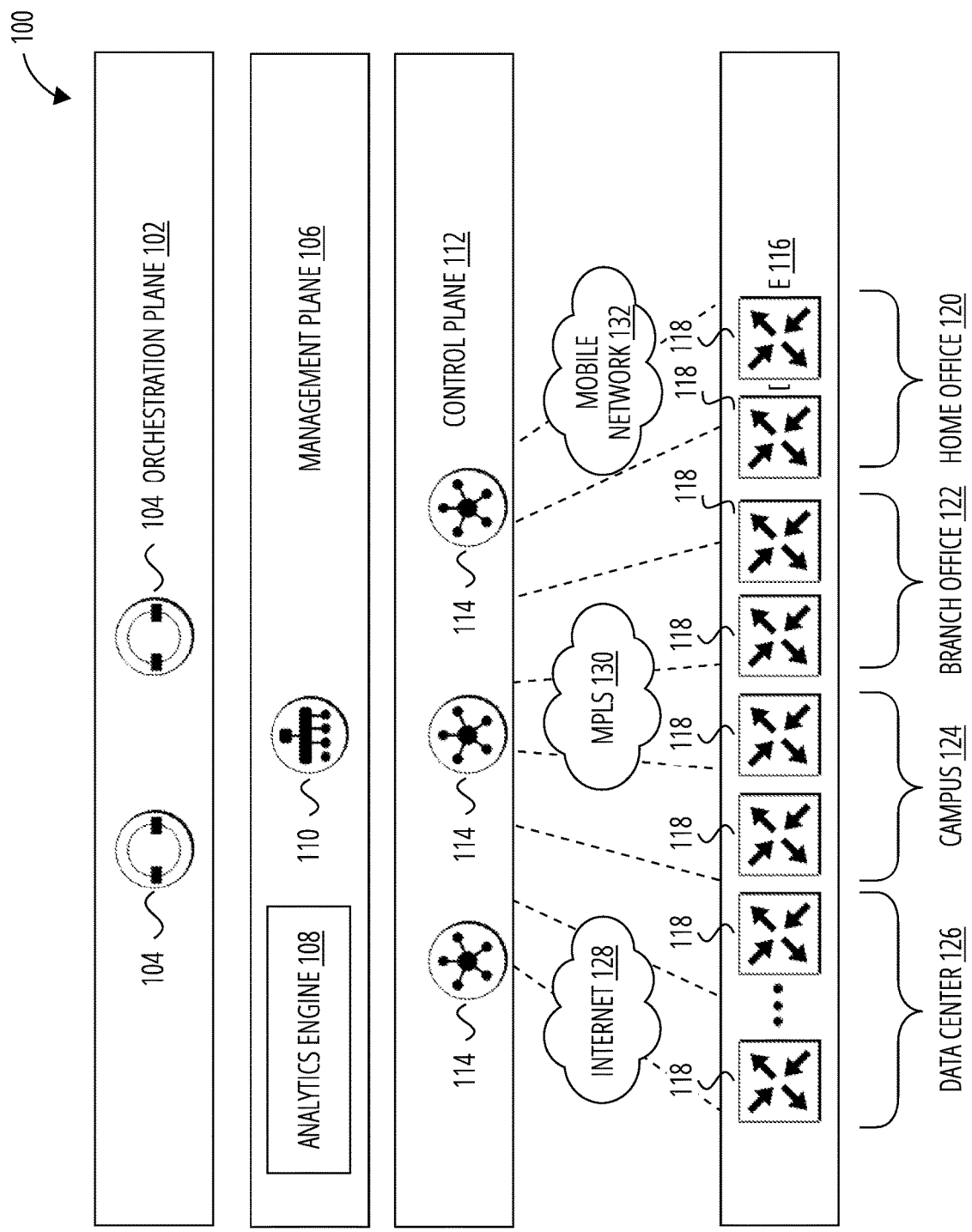
FIG. 1 illustrates an example of a high-level network architecture in accordance with an embodiment.

Various examples of the disclosure are discussed in detail below. While specific implementations are discussed, it should be understood that this is done for illustration purposes. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and such references mean at least one of the examples.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative, and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Discovering repair paths between two nodes in a network and identifying transition points between primary and secondary paths is advantageous for optimizing the performance, reliability, fault tolerance, and operational efficiency of modern networks. Aspects of the present disclosure are directed to addressing fault recovery and redundancy, minimized downtime, traffic optimization, Quality of Service (QoS) maintenance, path diversity, real-time adaptability, service assurance, service level agreements (SLA), security and threat mitigation, cross-domain communication, and reduced operational complexity.

The discovery of repair paths offers a substantial enhancement to fault recovery and redundancy, enabling swift detection of link or node outages and seamless transitions to alternative routes to maintain uninterrupted data transmission. Moreover, this proactive approach minimizes downtime by preemptively redirecting traffic before failures impact user experience, thereby mitigating service interruptions and ensuring heightened uptime.

Identifying specific transition points further refines traffic management, allowing for precision in rerouting to optimize load distribution and alleviate congestion. The recognition of transition points between primary and repair paths augments path diversity, fortifying the network against common-cause failures that might otherwise compromise both routes.

This dynamic adaptability extends to swiftly adjusting to evolving conditions through the discovery of new repair paths and transition points, thereby optimizing performance and fostering network stability. In the realm of security, the isolation of compromised segments and the redirection of traffic along secure repair paths act as robust measures against potential breaches, safeguarding the network's integrity.

Additionally, the identification of transition points transcends administrative boundaries, facilitating seamless communication and coordination across disparate network segments. By automating the discovery of repair paths and pinpointing transition points, manual intervention is minimized, simplifying network management and reducing the risk of human errors. Repair path discovery and the identification of transition points collectively reinforce network resilience, responsiveness, and security, ushering in a new era of fault-tolerant, high-performance network communication.

In one aspect, a method for monitoring a Fast Re-Route (FRR) path between a source node (Node-S) and a destination node (Node-E) in a network, includes generating a discovery-probe at the source node (Node-S) to detect at least one node with an FRR indicator along the FRR path that includes a plurality of next available nodes, where the discovery probe is forwarded to the plurality of next available nodes to initiate a repair path discovery along the FRR path. The method also includes upon the discovery probe reaching a first node with the FRR indicator, generating a primary probe configured to detect a primary path includes a first set of nodes to forward the primary probe towards the destination node, and a repair probe configured to detect a repair path includes a second set of nodes to forward the repair probe towards the destination node. The method also includes in response to receiving the primary probe via the primary path and the repair probe via the repair path at the destination node, sending the primary probe and the repair probe back to the source node to monitor the FRR path between the source node and the destination node.

In another aspects, the method may further include identifying a second node along the FRR path that includes a second repair path, wherein the second node does not include the FRR indicator, and forwarding the discovery probe to the next available node, wherein the discovery probe bypasses the second repair path.

In some aspects, the method may further include identifying a second node along the primary path that includes a second FRR indicator, wherein the second node is configured to generate a duplicate primary probe to detect the primary path includes a third set of nodes to forward the duplicate primary probe towards the destination node, and generate a duplicate repair probe to detect a repair path includes a fourth set of nodes to forward the repair probe towards the destination node.

In some aspects, the discovery probe comprises a hop count value, wherein the hop count value indicates a specific node along the FRR path to start discovery of the repair path.

In some aspects, the monitored FRR path sent to the source node indicates a node value representative of a total number of nodes in the primary path, and a hop count value indicated where the repair node is generated.

In some aspects, the discovery probe, the primary probe, and the repair probe are encapsulated within data packets that include a header indicating their respective roles and functions within an FRR path monitoring.

In some aspects, the method may further include triggering an FRR switchover process based on network conditions and performance metrics, wherein in response to the FRR switchover being triggered, the second probe is configured to generate a repair FRR Switchover Probe and send it along the repair path instead of the repair probe, to expedite the monitoring of the repair path and ensure network resiliency during FRR switchover events.

In one aspect, a network device includes one or more memories having computer-readable instructions stored therein. The network device also includes one or more processors configured to execute the computer-readable instructions to generate a discovery probe at a source node (Node-S) to detect at least one node with a Fast Re-Route (FRR) indicator along an FRR path that includes a plurality of next available nodes, wherein the discovery probe is forwarded to the plurality of next available nodes to initiate a repair path discovery along the FRR path; upon the discovery probe reach a first node with the FRR indicator, generate a primary probe configured to detect a primary path includes a first set of nodes to forward the primary probe towards a destination node, and a repair probe configured to detect a repair path includes a second set of nodes to forward the repair probe towards the destination node; and, in response to receiving the primary probe via the primary path and the repair probe via the repair path at the destination node, send the primary probe and the repair probe back to the source node to monitor the FRR path between the source node and the destination node.

In one aspect, one or more non-transitory computer-readable storage media includes computer-readable instructions, which when executed by one or more processors of a network device, cause the network device to generate a discovery probe at a source node (Node-S) to detect at least one node with a Fast Re-Route (FRR) indicator along an FRR path that includes a plurality of next available nodes, wherein the discovery probe is forwarded to the plurality of next available nodes to initiate a repair path discovery along the FRR path; upon the discovery probe reach a first node with the FRR indicator, generate a primary probe configured to detect a primary path includes a first set of nodes to forward the primary probe towards a destination node, and a repair probe configured to detect a repair path includes a second set of nodes to forward the repair probe towards the destination node; and, in response to receiving the primary probe via the primary path and the repair probe via the repair path at the destination node, send the primary probe and the repair probe back to the source node to monitor the FRR path between the source node and the destination node.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network For effective network communication, ensuring seamless and reliable data transmission is important. In today's complex networking environment, maintaining optimal performance and fault tolerance requires intricate data flows, repair paths, and continuous monitoring. To overcome various challenges, customer networks need effective traffic management and path monitoring. However, even when pre-configured repair paths exist, primary link failures can cause significant traffic loss, resulting in unexpected degradation of network performance. Therefore, providing oversight of both primary and repair paths and timely alerts to network administrators to maintain network efficiency are important.

Moreover, in specific scenarios, the transition from primary to repair paths, facilitated by mechanisms such as Point of Local Repair (PLR) and Fast Re-Route (FRR), has exposed instances of selective packet drops. This selective packet drop is caused by a disparity in Maximum Transmission Unit (MTU) values between the primary and repair paths. The consequential requirement for packet fragmentation, driven by MTU inconsistencies during PLR/FRR transitions, has resulted in the loss of packets.

While existing technologies, including Multi-hop Bidirectional Forwarding Detection (MH-BFD), Seamless BFD (SBFD), Multi-Hop Performance (delay/loss) Measurement (MH-PM), Path MTU discovery, In-Situ OAM (iOAM), Direct Export (Dex), path-assurance, congestion detection, health monitoring, and path-tracing (PT) techniques, offer remedies for path monitoring and network parameter evaluation, they predominantly concentrate on observing active data paths—routes engaged in routine data transmission during regular operations. Consequently, the monitoring of repair paths, which usually come into play during failure scenarios, presents a formidable challenge. Moreover, the inherent limitations of these methodologies in steering traffic effectively between primary and repair paths further impede comprehensive monitoring, particularly in intricate network configurations.

Furthermore, the expansion of network topologies across multiple administrative domains presents another challenge. The traversal of administrative boundaries introduces an added layer of complexity.

To address these deficiencies, the present disclosure provides a holistic approach that not only monitors the entirety of the network path but also ensures coherence between primary and repair paths, effectively mitigating packet loss during switchover events from primary path to repair path, for example, due to a failure event. Techniques described herein elevate the dependability, fault tolerance, and flexibility of data packet transmission within contemporary networking environments.

The disclosed technology provides a solution to overcome these challenges by enabling the traversal and discovery of Fast Re-Route (FRR) primary and repair paths between a source and destination node using MPLS Network Action Sub-Stack (MNAS)/IPv6 extension headers. By doing so, the present disclosure facilitates Operations, Administration, and Maintenance (OAM) processes such as Ping, Traceroute, iOAM, DEX, Bidirectional Forwarding Detection (BFD), Performance Measurement (PM) (TWAMP, OWAMP and STAMP), Path Tracing (PT), and more, allowing for the execution of additional functionalities. Various routing and control-plane protocols including OSPF, ISIS, BGP, LDP, RSVP, etc. packets benefit from ability to traverse FRR and primary and repair paths. Techniques presented herein operate in two distinct modes, namely a "continuous mode" and "targeted mode" that can be utilized to traverse and discover FRR paths. These will be further described below.

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 106, a control plane 112, and a data plane 116. The orchestration plane 102 can assist in the automatic on-boarding of edge network devices 118 (e.g., switches, routers, etc.) in an overlay network. The orchestration plane 102 can include one or more physical or virtual network orchestrator appliances 104. The network orchestrator appliances network orchestrator appliance 104 can perform the initial authentication of the edge network devices 118 and orchestrate connectivity between devices of the control plane 112 and the data plane 116. In some embodiments, the network orchestrator appliances 104 can also enable communication of devices located behind Network Address Translation (NAT). In some embodiments, physical or virtual Cisco® SD-WAN vBond appliances can operate as the network orchestrator appliances 104.

The management plane 106 can be responsible for central configuration and monitoring of a network. The management plane 106 can include one or more physical or virtual network management appliances 110. In some embodiments, the network management appliances 110 can provide centralized management of the network via a graphical user interface to enable a user to monitor, configure, and maintain the edge network devices 118 and links (e.g., internet transport network 128, MPLS network 130, 4G/Mobile network 132) in an underlay and overlay network. The network management appliances 110 can support multi-tenancy and enable centralized management of logically isolated networks associated with different entities (e.g., enterprises, divisions within enterprises, groups within divisions, etc.). Alternatively, or in addition, the network management appliances 110 can be a dedicated network management system for a single entity. In some embodiments, physical or virtual Cisco® SD-WAN vManage appliances can operate as the network management appliances 110.

The control plane 112 can build and maintain a network topology and make decisions on where traffic flows. The control plane 112 can include one or more physical or virtual network control appliances 114. The network control appliances 114 can establish secure connections to each edge network device 118 and distribute route and policy information via a control plane 112 protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network control appliances 114 can operate as route reflectors. The network control appliances 114 can also orchestrate secure connectivity in the data plane 116 between and among the edge network devices 118. For example, in some embodiments, the network control appliances 114 can distribute crypto key information among the edge network devices 118. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network control appliances 114.

The data plane 116 can be responsible for forwarding packets based on decisions from the control plane 112. The data plane 116 can include the edge network devices 118, which can be physical or virtual edge network devices. The edge network devices 118 can operate at the edges various network environments of an organization, such as in one or more data centers 126, campus networks 124, branch office networks 122, home office networks 120, and so forth, or in the cloud (e.g., Infrastructure as a Service (IaaS), Platform as a Service (PaaS), SaaS, and other cloud service provider networks). The edge network devices 118 can provide secure data plane 116 connectivity among sites over one or more WAN transports, such as via one or more Internet transport networks 128 (e.g., Digital Subscriber Line (DSL), cable, etc.), MPLS networks 130 (or other private packet-switched network (e.g., Metro Ethernet, Frame Relay, Asynchronous Transfer Mode (ATM), etc.), mobile networks 132 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 118 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 118.

Figure 2:
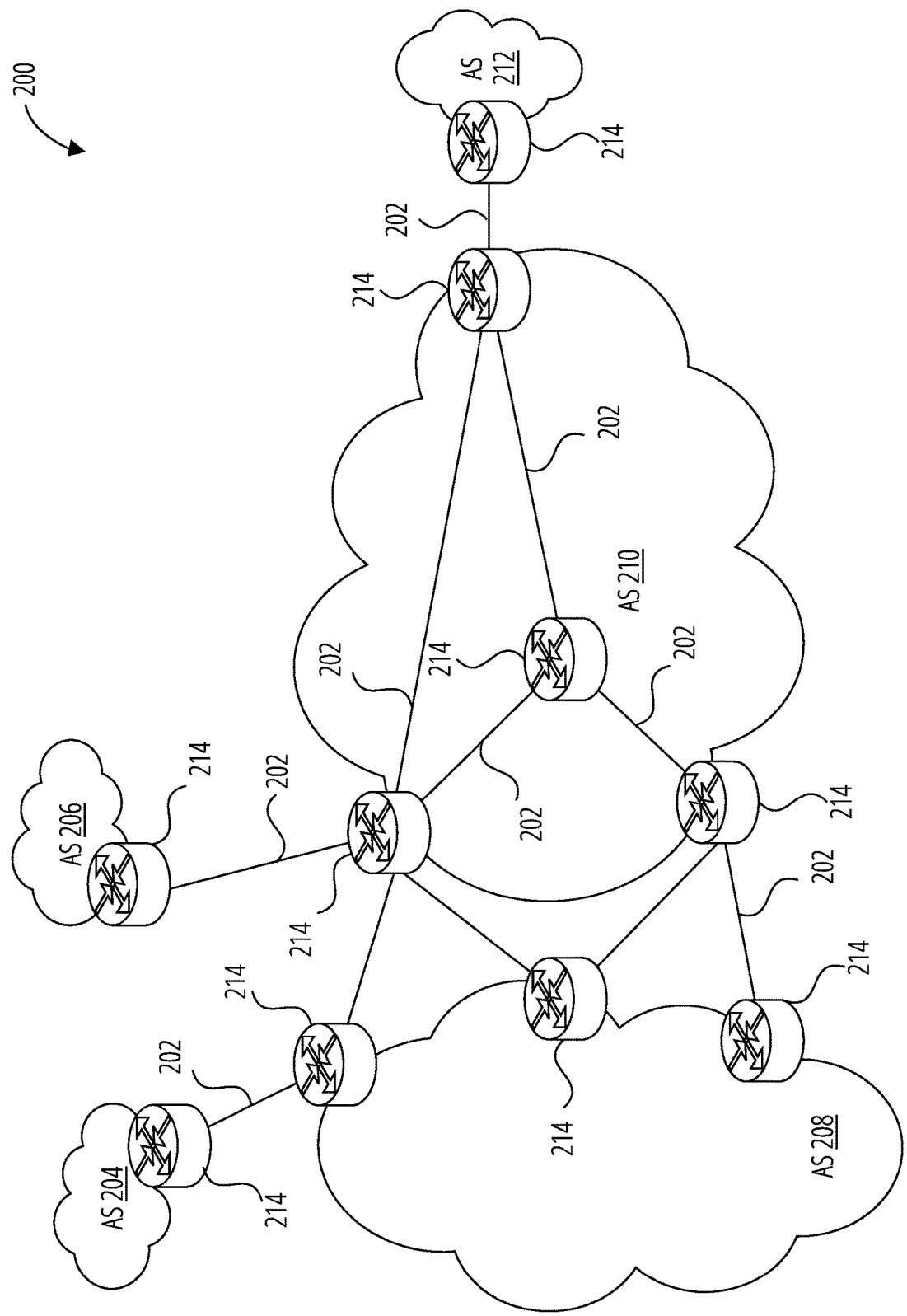
FIG. 2 illustrates an example communication network including one or more autonomous systems (ASes) according to some aspects of the present technology.

FIG. 2 illustrates an example communication network 200 including one or more autonomous systems (ASes) according to some aspects of the present technology.

A computer network 200 is a geographically distributed collection of nodes interconnected by communication links 202 and segments for transporting data between end nodes, such as personal computers and workstations, or other network devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Since management of interconnected computer networks 200 can prove burdensome, smaller groups of computer networks may be maintained as routing domains or autonomous systems. An Autonomous System (AS) is a network or group of networks under common administration and with common routing policies. A typical example of an AS is a network administered and maintained by an Internet Service Provider (ISP). Customer networks, such as universities or corporations, connect to the ISP, and the ISP routes the network traffic originating from the customer networks to network destinations that may be in the same ISP or may be reachable only through other ISPs.

To facilitate the routing of network traffic through one or more ASes, the network elements of the ASes need to exchange routing information to various network destinations. Border Gateway Protocol (BGP) is an Exterior Gateway Protocol (EGP) that is used to exchange routing information among network elements (e.g., routers) in the same or different ASes. A computer host that executes a BGP process is typically referred to as a BGP host or a BGP network device. To exchange BGP routing information, two BGP hosts, or peers, first establish a transport protocol connection with one another. Initially, the BGP peers exchange messages to open a BGP session, and, after the BGP session is open, the BGP peers exchange their entire routing information. Thereafter, only updates or changes to the routing information are exchanged, or advertised, between the BGP peers. The exchanged routing information is maintained by the BGP peers during the existence of the BGP session.

The networks within an AS are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

FIG. 2 is a schematic block diagram of an example computer network 200 illustratively comprising network devices 214 interconnected by various methods of communication. For instance, the links 202 may be any suitable combination of wired links and shared media (e.g., wireless links, Internet Exchange Points, etc.) where certain network devices 214, such as, e.g., routers, computers, etc., may be in communication with other network devices 214, e.g., based on distance, signal strength, current operational status, location, etc. Those skilled in the art will understand that any number of network devices 214, links, etc. may be used in the computer network, and that the view shown herein is for simplicity.

Data packets (e.g., traffic and/or messages sent between the network devices 214) may be exchanged among the network devices 214 of the computer network 200 using predefined network communication protocols such as certain known wired protocols, as well as wireless protocols or other shared-media protocols where appropriate.

The computer network 200 includes a set of autonomous systems (AS) 204, 206, 208, 210 and 212. The computer network 200 may be positioned in any suitable network environment or communications architecture that operates to manage or otherwise direct information using any appropriate routing protocol or data management standard. For example, computer network 200 may be provided in conjunction with a border gateway protocol (BGP).

As noted above, an AS may be a collection of connected Internet Protocol (IP) routing network devices 214 under the control of one or more network operators that presents a common, clearly defined routing policy to a network (e.g., the Internet). Usually, an AS comprises network devices 114 that are established on the edge of the system, and that serve as the system's ingress and egress points for network traffic. Moreover, the network devices 214 may be considered edge network devices, border routers, or core network devices within the respective AS. These network devices typically, but not always, are routers or any other element of network infrastructure suitable for switching or forwarding data packets according to a routing protocol or switching protocol. For the purposes of the present disclosure, the network devices 214 located within an AS may alternatively be referred to as "forwarding network devices" or "intermediate network devices." Moreover, for illustration purposes, the ASes 204, 206, 208, 210 and 212 are shown with a limited number of network devices 214. In an actual implementation, however, an AS normally comprises numerous routers, switches, and other elements.

Each AS 204, 206, 208, 210 and 212 may be associated with an Internet Service provider (ISP). Even though there may be multiple ASes supported by a single ISP, the Internet only sees the routing policy of the ISP. That ISP must have an officially registered Autonomous System Number (ASN). As such, a unique ASN is allocated to each AS for use in BGP routing. ASNs are important primarily because they uniquely identify each network on the Internet.

To facilitate the routing of network traffic through the ASes, or more specifically, the network devices 214 within the ASes, the network devices may exchange routing information to various network destinations. As described above, BGP is conventionally used to exchange routing and reachability information among network devices 214 within a single AS or between different ASes. One particular example of BGP is BGPv4, as defined in Request for Comments (RFC) 1771 of the Internet Engineering Task Force (IETF). Various embodiments may implement other versions of BGP, however, and the use of BGPv4 is not required. The BGP logic of a router is used by the data collectors to collect BGP AS path information, e.g., the "AS_PATH" attribute, as described further below, from BGP tables of border routers of an AS, to construct paths to prefixes.

To exchange BGP routing information, two BGP hosts (network devices 214), or peers, first establish a transport protocol connection with one another. Initially, the BGP peers exchange messages to open a BGP session, and, after the BGP session is open, the BGP peers exchange their entire routing information. Thereafter, in certain embodiments, only updates or changes to the routing information, e.g., the "BGP UPDATE" attribute, are exchanged, or advertised, between the BGP peers. The exchanged routing information is maintained by the BGP peers during the existence of the BGP session.

The BGP routing information may include the complete route to each network destination, e.g., "destination network device," that is reachable from a BGP host. A route, or path, comprises an address destination, which is usually represented by an address prefix (also referred to as prefix), and information that describe the path to the address destination. The address prefix may be expressed as a combination of a network address and a mask that indicates how many bits of the address are used to identify the network portion of the address. In Internet Protocol version 4 (IPv4) addressing, for example, the address prefix can be expressed as "9.2.0.2/16". The "/16" indicates that the first 16 bits are used to identify the unique network leaving the remaining bits in the address to identify the specific hosts within this network.

A path joining a plurality of ASes, e.g., links 202, may be referred to as an "AS_PATH." the AS_PATH attribute indicates the list of ASes that must be traversed to reach the address destination. For example, as illustrated in FIG. 1, the AS 204 may store an AS_PATH attribute of "204, 206, 208, 210 and 212" where the address destination is the AS 204 (or a particular IP address within AS 212). Here, the AS_PATH attribute indicates that the path to the address destination AS 212 from AS 208 passes through ASes 204, 206 and 210, in that order.

Although it may be preferable that all network devices 214 in the respective ASes 204, 206, 208, 210 and 212 be configured according to BGP, in a real-world implementation, it may be unlikely that each network device communicates using BGP. Thus, the disclosed embodiments are applicable to scenarios where all network devices 214 in the computer network 100 are configured according to BGP, as well as scenarios where only a subset of the network devices 214 is configured as such. Moreover, between any of the ASes, there may be a single communication path 202, e.g., between AS 204 and AS 208, as shown in FIG. 1, or there may be multiple communication paths 202, e.g., between AS 208 and AS 210. Thus, the disclosed embodiments are applicable to either case, as described in further detail below.

Moreover, a security extension to the BGP has been developed, referred to as BGPSEC, which provides improved security for BGP routing. BGP does not include mechanisms that allow an AS to verify the legitimacy and authenticity of BGP route advertisements. The Resource Public Key Infrastructure (RPKI) provides a first step towards addressing the validation of BGP routing data. BGPSEC extends the RPKI by adding an additional type of certificate, referred to as a BGPSEC router certificate, that binds an AS number to a public signature verification key, the corresponding private key of which is held by one or more BGP speakers within this AS. Private keys corresponding to public keys in such certificates can then be used within BGPSEC to enable BGP speakers to sign on behalf of their AS. The certificates thus allow a relying party to verify that a BGPSEC signature was produced by a BGP speaker belonging to a given AS. Thus, a goal of BGPSEC is to use signatures to protect the AS Path attribute of BGP update messages so that a BGP speaker can assess the validity of the AS Path in update messages that it receives. It should be understood, however, that the embodiments for implementing AS Path security disclosed herein are not limited to BGPSEC; certain embodiments may, additionally or alternatively, be applicable to other suitable protocols, including, for example, SoBGP, S-BGP, and PGPBGP, to name just a few.

Figure 3:
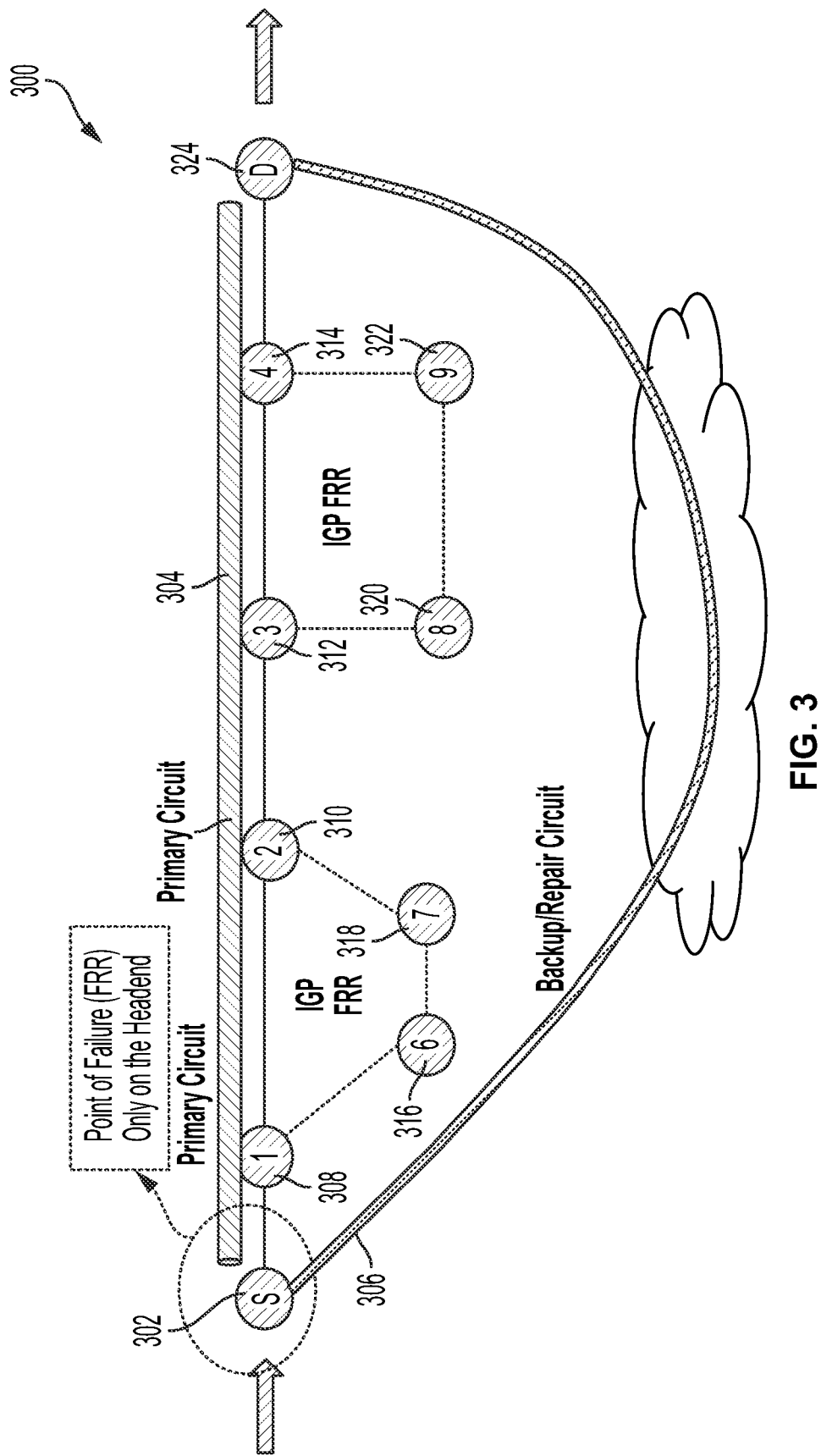
FIG. 3 illustrates an example circuit diagram depicting Segment Routing (SR) between a source node and a destination node that includes a backup circuit according to some aspects of the present technology.

FIG. 3 illustrates an example circuit diagram depicting a segment routing (SR) between a source node and a destination node that includes a backup circuit according to some aspects of the present technology. Example circuit diagram 300 depicts a SR between a source node 302 and a destination node 324. Circuit diagram 300 can include primary circuit 304 and a backup circuit 306 (repair circuit 306), according to some aspects of the present technology. The repair circuit 306 is designed to protect the primary circuit 304 from the head-end perspective as an end-to-end solution since the head-end knows how to send probes to the protected path from its control plane.

As illustrated, configuration of circuit diagram 300 can be used to enable liveness-detection through the implementation of probe-based schemes, in addition to performance delay and loss monitoring on end-to-end primary and backup paths as part of path protection. This approach allows for fast detection of network faults and efficient repair by tracing the repair paths from the headend. With Segment Routing for Repair, network operators can maintain reliable and highly resilient networks with minimal disruption to users and reduced operational costs. Furthermore, this approach also allows for the detection of faults across different administrative domains.

The source node 302, as the head-end in the depiction of FIG. 3, is configured as the starting node of the FRR path. At the source node 302, primary circuit 304 and repair circuit 306 can be created using multiple segment routing (SR) adjacency segment identifiers (SIDs) associated with multiple adjacencies from a network node, to reach destination node 324. Repair circuit 306 may be created to protect primary circuit 304 from detected network failures at source node 302.

If a failure is not detected at source node 302, repair circuit 306 is not utilized to reach the destination node 324, and data packets are instead transmitted along primary circuit 304 to node 308. Node 308 can perform a detection to identify if a failure has occurred. If a failure has not occurred, node 308 can transmit data packets to the next available node, (e.g., node 310), followed by node 312.

Upon a failure being detected, node 308 can re-route the data packets to a backup route in accordance with an interior gateway protocol (IGP) FRR intended to provide fast and efficient protection against link or node failures. The backup route can include transmitting the data packets between node 316, and node 318, to be received by node 310 on primary circuit 304. Node 310 can subsequently transmit the data packets to node 312. Node 312 can transmit data packets along primary circuit 304 to node 314 and then to destination node 324, as long as no node failure occurs on primary circuits 304 after node 312.

In case of a node failure at node 312, the data packets can be rerouted along an alternate IGP FRR path as a backup. The backup route can include transmitting data packets from node 312 to node 320 and then to node 322, which will ultimately be received by node 314 along primary circuit 304. Upon node 314 receiving the data packets, node 314 can transmit the data packets to destination node 324.

In some examples, in addition to the circuit-style communication, segment-routing traffic engineering can further be implemented where repair paths exist between two endpoints that are not visible to the head-end. Instead, the repair path exists on midpoint nodes. Furthermore, the repair paths could be located in different administrative domains, of which the head-end is not aware.

The current technology involves encoding forwarding states within packets, allowing the data plane to react to those states and forward packets through the primary or repair path, regardless of the FRR state. This feature enables seamlessly operations across various domains and control-plane technologies.

In the steady-state, SR-Path Assurance/Path Tracing can monitor the primary data plane paths. Path Tracing includes tracing the packet path between source and destination nodes by recording interface identifiers along the path, as well as by recording timestamps and interface load on each hop for per-hop delay and packet loss calculations. For instance, in the case of Equal Cost Multi-Path (ECMP) routing, different ECMP paths can be tested by encoding different entropy-labels (for MPLS and Segment-Routing MPLS (SR-MPLS)) and flow-labels (for IPv6 and SRv6) in the packet. Path tracing will now be described along the repair paths, with reference to FIG. 4.

Figure 4:
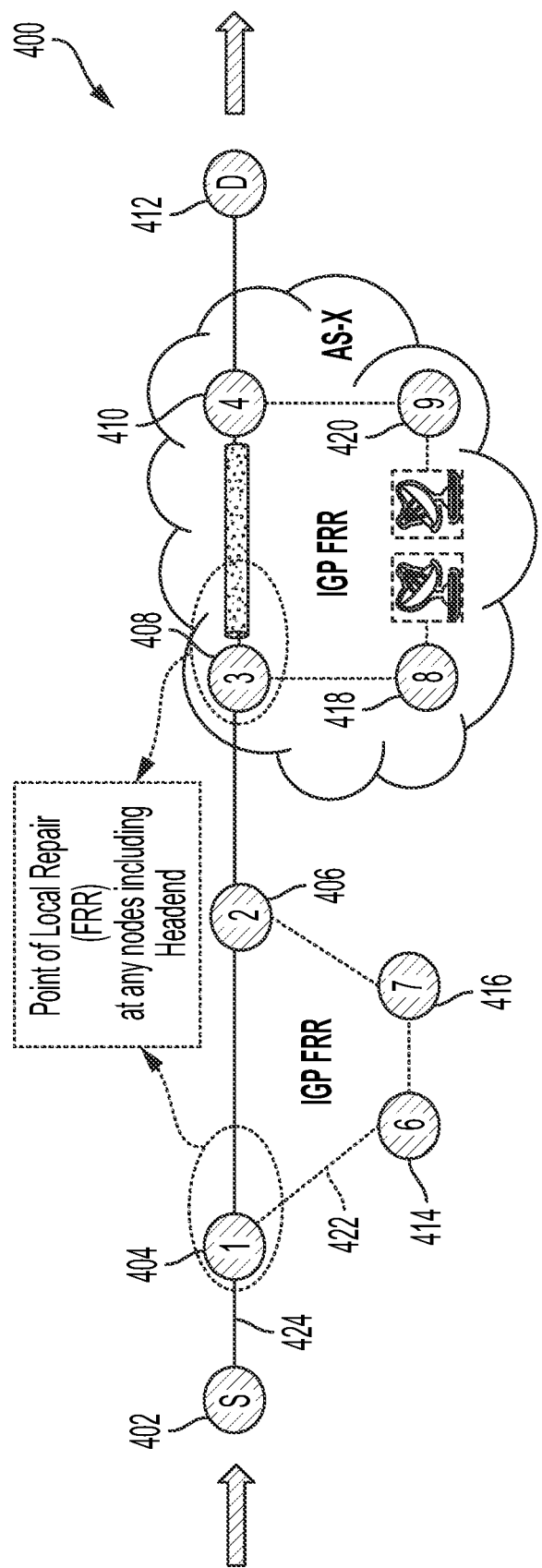
FIG. 4 illustrates an example communication diagram between a source node and a destination node implementing SR path assurance/path tracing that tests all ECMP paths between two endpoints, according to some aspects of the present technology.

FIG. 4 illustrates an example communication diagram between a source node and a destination node implementing SR-path assurance/path tracing that tests all ECMP paths between two endpoints, according to some aspects of the present technology. As illustrated in FIG. 4, it is possible to monitor repair paths for point of local repair (PLR) nodes (e.g., node 404 and node 408).

In an example depicted by FIG. 4, source node 302 can send probe traffic to node 404. The probe traffic can be forced to take repair FRR path 422 through node 414, node 416, to be routed to node 406. In some examples, the probe traffic is forced to take repair FRR path 422 using SR-Path Assurance or Path Tracing. When the probe traffic reaches node 406, the probe traffic can identify a node failure on primary FRR path 424 including nodes 408 and 410. The probe traffic can also determine that repair FRR path 422, which includes nodes 418, 420, and 410, is also experiencing a node failure due to the node failure at node 408. Therefore, the probe traffic can send this information back to source node 402, indicating that destination node 412 is inaccessible due to the node failure at node 408 on both primary FRR path 424 and repair FRR path 422. Thus, the information carried by the probe traffic allows for liveness detection on the repair paths between two endpoints from source node 402, thus greatly enhancing network reliability. Based on the results of the probes, source node 402 can take appropriate corrective action with the provided information. This enables network operators to identify faults and restore service while minimizing disruptions quickly.

In some examples, in order to identify network paths that can be used to traverse network faults or failures among one or more nodes, an MPLS sub-stack and/or IPv6 extension headers may be utilized, which can assist in determining the next hop for a data packet, as well as provide routing information to reach a destination node.

Figure 5A:
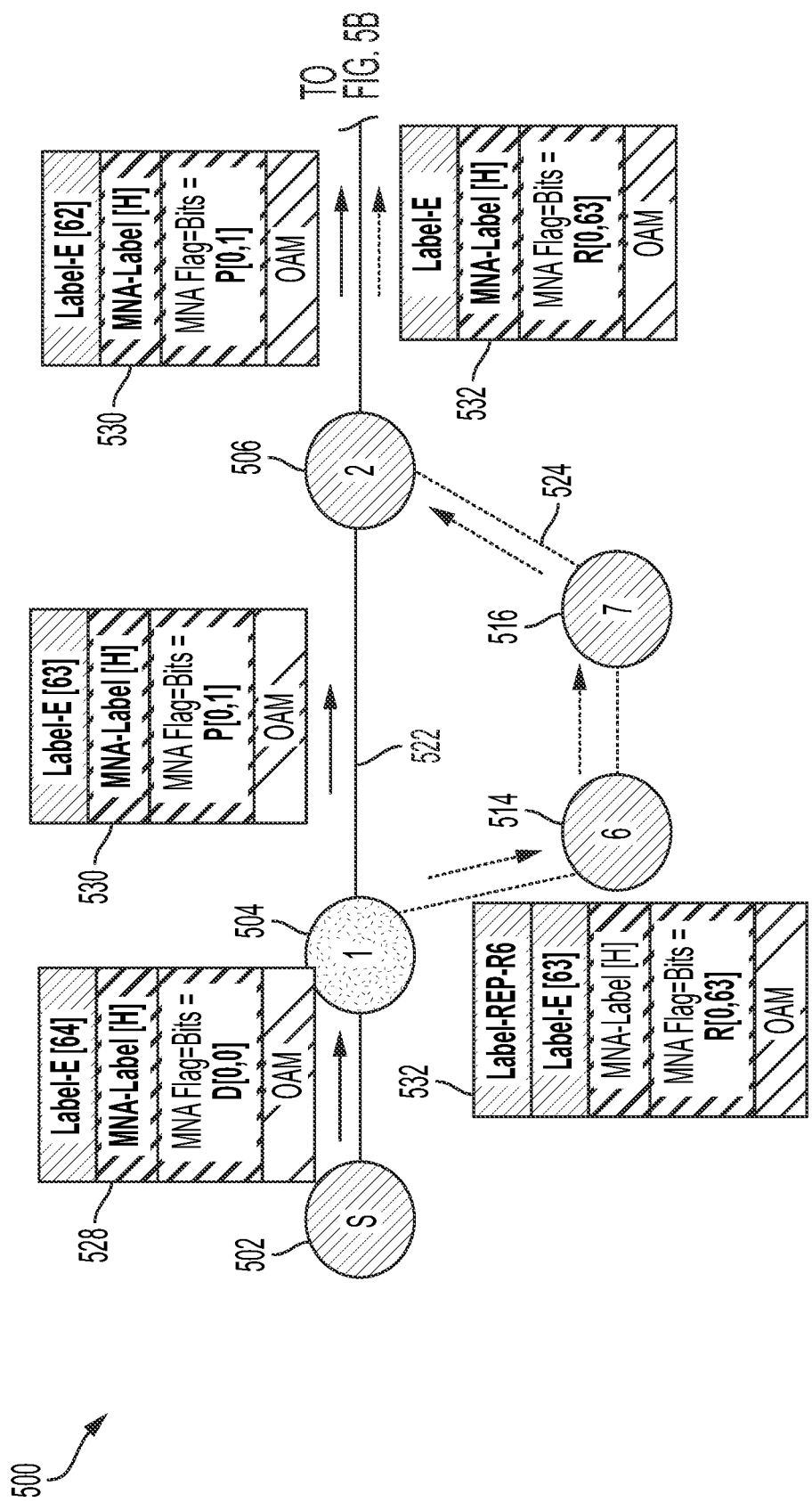
FIG. 5A-5B illustrates an example message flow between a source node and destination node in a continuous mode according to some aspects of the present technology.
Figure 5B:
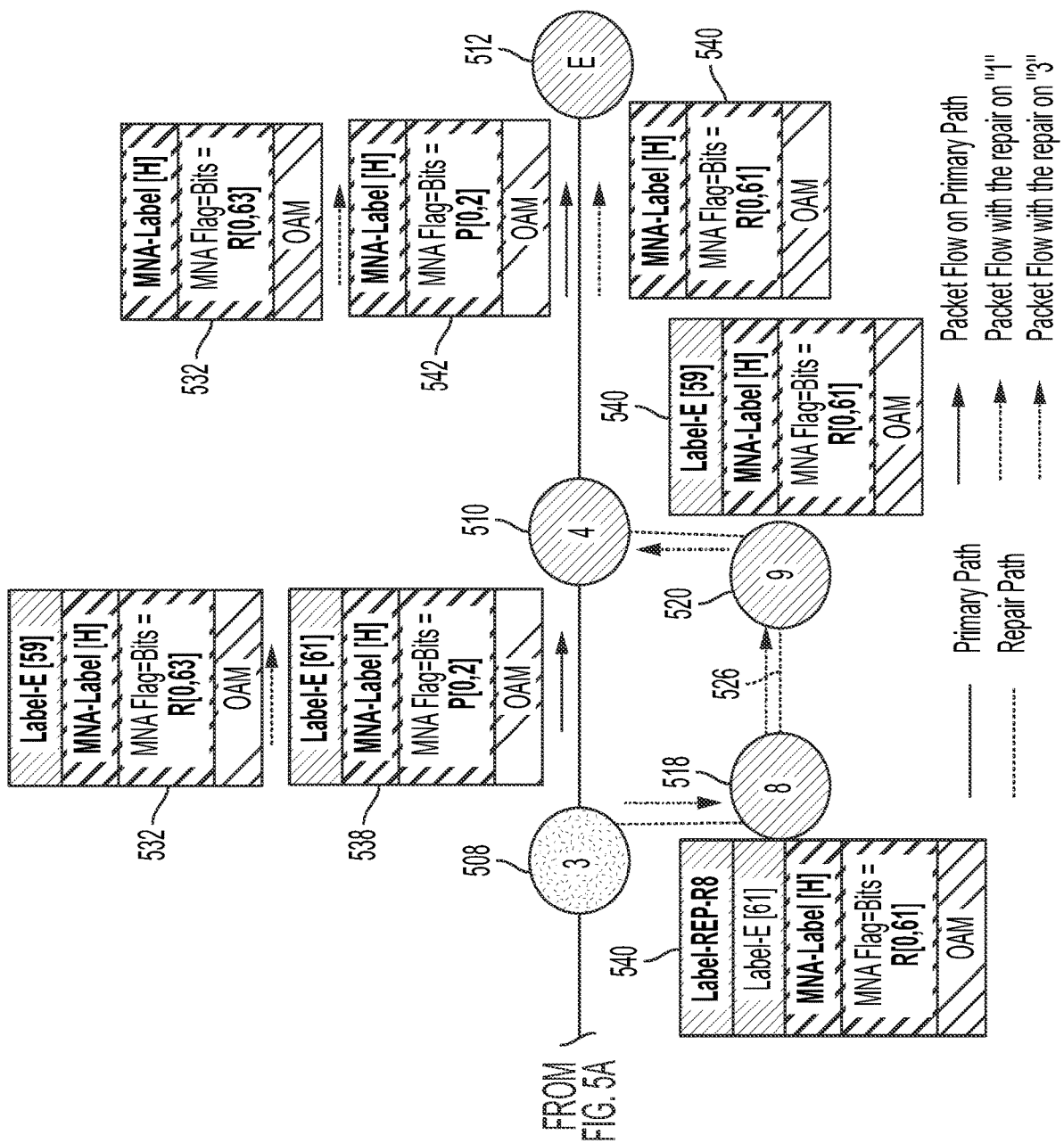

FIG. 5A-5B illustrates an example message flow between a source node and destination node in a continuous mode according to some aspects of the present technology. Example message flow 500 can be between source node 502 and destination node 512 in a continuous mode, according to some aspects of the present technology. In continuous mode, a discovery probe packet with a hop-by-hop scope option is sent from source node 502 to destination node 512 to discover all FRR nodes on the path. The packet may be duplicated at the first FRR node, with one sent through the primary path, via a primary probe, and another through the repair path, via a repair probe. The discovery probe packet can follow an FRR path until an FRR switchover indication is detected. An FRR switchover can indicate a process of switching or diverting network traffic from the primary FRR path to the repair FRR path when a network failure or fault is detected or performance metric is violated. The FRR switchover can further indicate an action that can take place when a network event triggers the use of the repair FRR path to maintain network continuity and reduce service disruption. Accordingly, if an FRR switchover is triggered in any node, the primary probe may be dropped. Whenever the primary probe hits an FRR node, the primary probe can duplicate a repair probe packet and forward the same to the repair FRR path, while the primary probe continues on the primary FRR path. The repair probe can then flow through the regular data path from that point and does not overlap with any other repair path.

In FIG. 5A-5B, two FRR paths are shown in communication between source node 502 and destination node 512 (primary FRR path 522 through nodes 504, 506, 508, 510) and a repair path formed of first repair path 524 (through nodes 504, 514, 516, and back to node 506) and second repair path 526 (through nodes 508, 518, 520, and back to node 510).

Starting from source node 502, a discovery probe 528 is generated with an MPLS Network Action (MNA) header that includes a "Start-DIS" set to zero ("0") and "FRR-Node-Count" set to zero in the MNA flag. The "Start-DIS" in the discovery probe allows the source node 502 to start the repair FRR path discovery from a specific node on the path based on the hop count. If set to zero, this indicates that discovery should begin from source node 302, whereas if it is set to a non-zero value, it starts when Start-DIS>TTL. This helps network operators quickly locate and repair faults in their networks. Additionally, the MNA flag field can be used to monitor their network performance and make informed decisions about maintenance and upgrades in the long run.

This discovery probe 528 may then be forwarded to node 504. When the discovery probe 528 reaches node 504, the discovery probe detects that FRR capability is available.

This results in generation of two probes—a primary probe 530 and a repair probe 532. primary probe 530 may be generated with "FRR-Node-Count" set to "1", and is sent along primary FRR path 522 towards node 506. Simultaneously, a repair probe 532 is generated with "FRR-Node-Count" set to the current TTL value, after being decremented. Repair probe 532 is then sent along first repair path 524. The FRR-Node-Count field in discovery probe 528 keeps track of the number of FRR nodes detected on the path for the Primary-Probe, and from where the repair probe and the FRR switchover probe was generated based on hop count. Node 504, which has the FRR capability, lacks information about the status of other nodes on the first repair path 524, such as node 514, node 516, and node 506.

In one example, Node 506 forwards primary probe 530 and repair probe 532 to node 508. Repair probe 532 is forwarded by node 508 to node 510 as a regular data packet. The FRR node count increases in the primary probe 530 received from node 504 when it reaches node 506. With FRR capability available at node 508, node 508 creates a second primary probe 538 and a second repair probe 540. These probes are transmitted along primary FRR path 522 and second repair path 526, respectively. Upon being received at node 510, node 510 modifies the FRR node count field in second primary probe 538 by incrementing the count field followed by forwarding the updated packet as Final primary probe 542 to destination node 512.

Second repair probe 540, upon being received by node 518 along second repair path 526 is modified (the current TTL value in second repair probe 540 is decremented), and forwarded to node 520 and then to node 510. Node 510 then sends repair probe 532, Final primary probe 542, and second repair probe 540 as regular data packets to destination node 512. At destination node 512, the MNA option, originally possessing a hop-by-hop discovery configuration is changed to an end-to-end discovery configuration and the three probes (i.e., repair probe 532, second repair probe 540, and Final primary probe 542) are sent back to the source node 502.

Figure 6A:
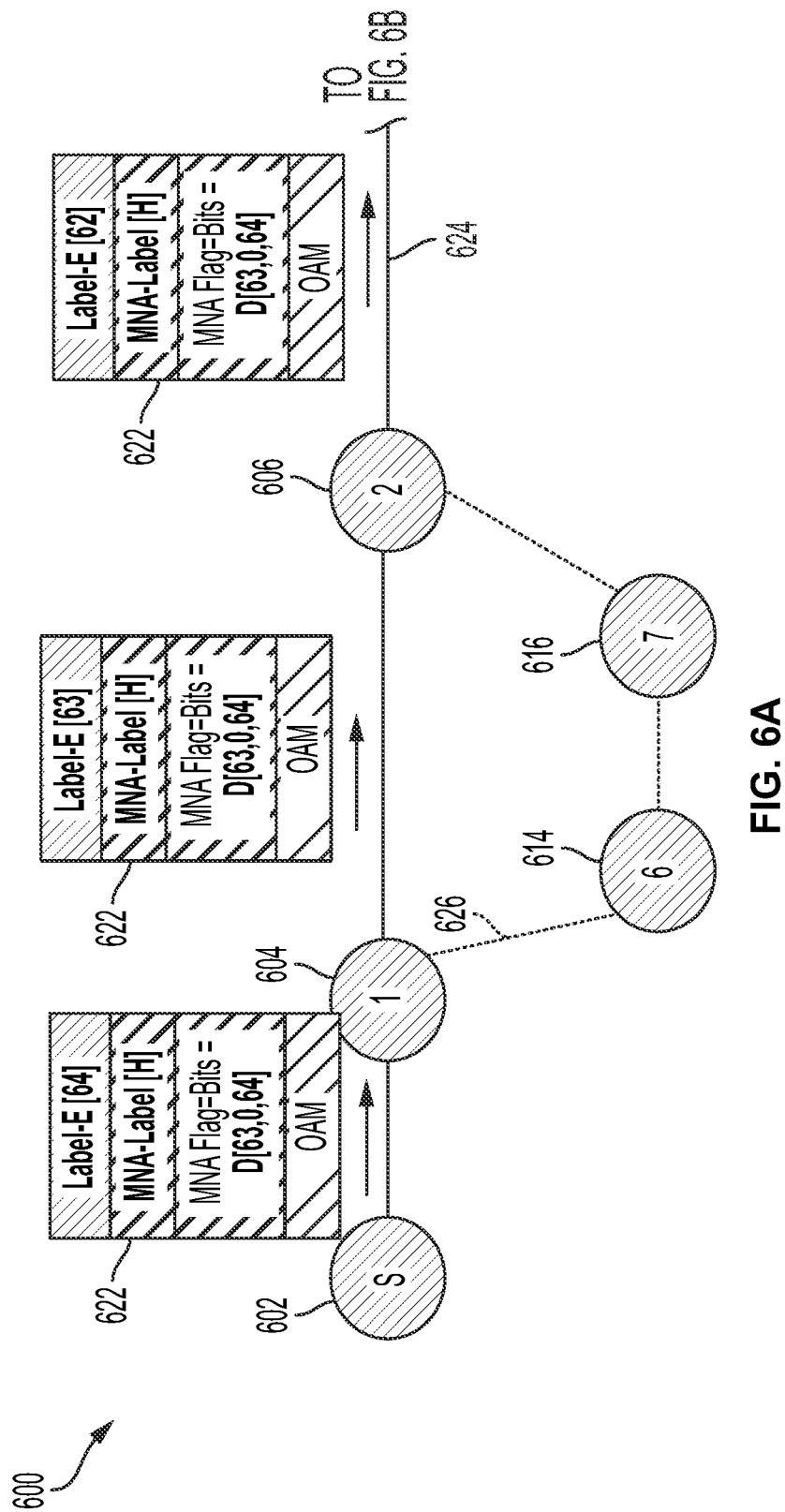
FIG. 6A-6B illustrates an example communication diagram between a source node and destination node in a targeted mode according to some aspects of the present technology.
Figure 6B:
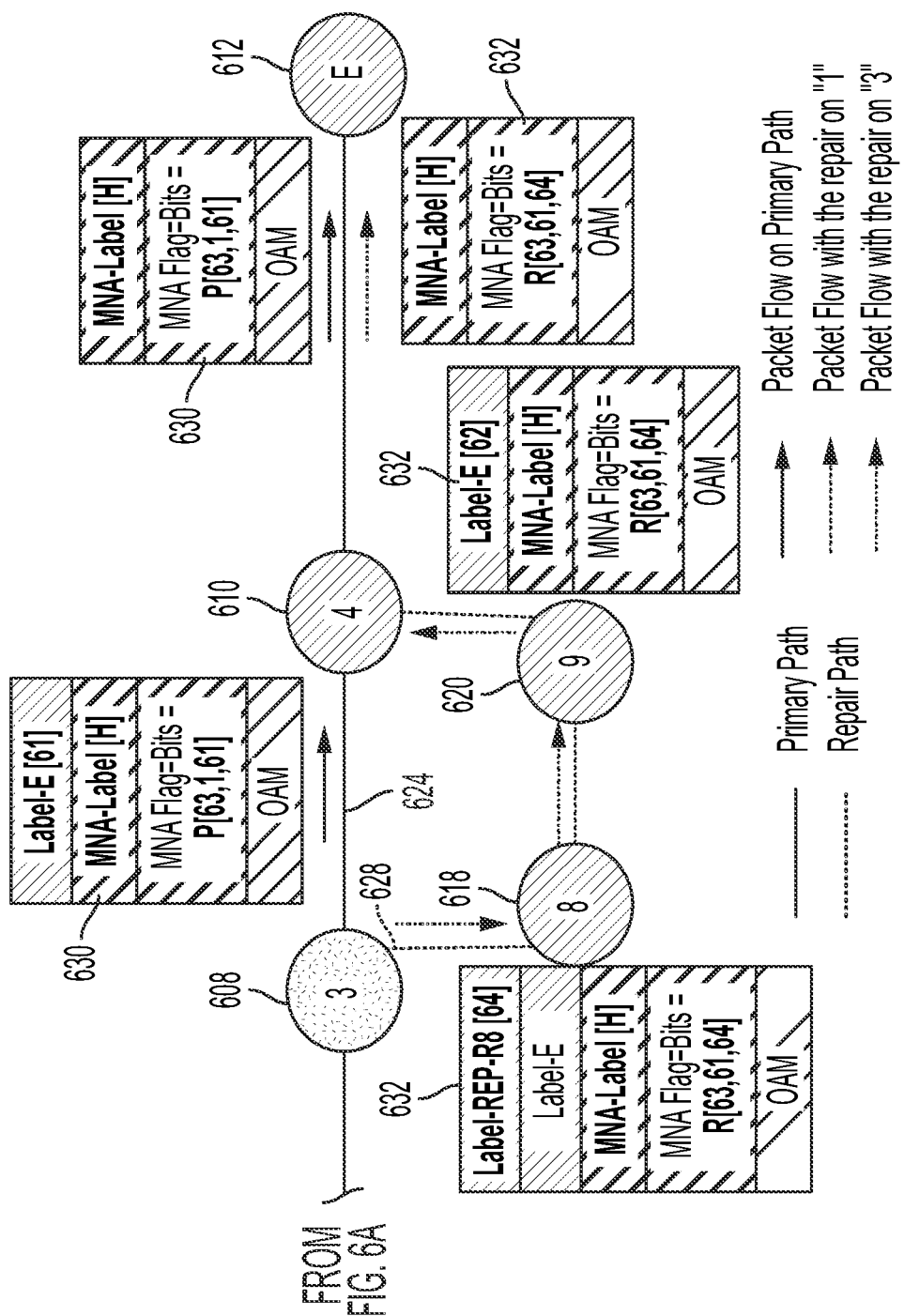

FIG. 6A-6B illustrates an example communication diagram between a source node and destination node in a targeted mode, according to some aspects of the present technology. In this mode, the described example process includes sending a discovery-probe packet with a hop-by-hop discovery configuration from a source node to a destination node to traverse and discover the first occurrence of a node with FRR capability. In one example, a single discovery probe packet is sent from a source towards the destination with the "Start-DIS" field set with the hop from where it needs to start the discovery for the first occurrence of the FRR node. When the discovery-probe hits the first FRR node based on "Start-DIS", it sends two probes, namely a primary probe towards the primary path and a repair probe towards the repair path. The primary-probe packet flows through the primary path, if the FRR switchover is triggered in any of the node, then the primary-probe is dropped. The primary probe also carries the hop count at the node based on the TTL value in the packet. The repair probe carries the hop count at the node based on the TTL value in the packet and flows through the regular data path from that point.

With reference to non-limiting example of FIG. 6A-6B, in a targeted mode, a single discovery probe packet with a hop-by-hop discovery configuration is sent from source node 602 to destination node 612 for tracing a specific FRR repair path. Similar to FIG. 5A-5B, there are two FRR paths between source node 602 and destination node 612. The first path is primary FRR path 624 between source node 602 and destination node 612 through nodes 604, 606, 608, and 610. The other path is a repair path comprising of a first repair FRR paths 626 (through nodes 604, 614, 616, and 606) and second repair FRR path 628 (through nodes 608, 618, 620 and 610).

The source node 602 generates a discovery probe 622 that includes an MPLS MNA header where the TTL is set as "64", "Start-DIS" as "63", "FRR-Node-Count" as "0" and "Repair-Path-TTL" as "1". The Repair-Path-TTL is decremented by 1 after passing through each intermediate node along primary FRR path 624. This packet is then forwarded to node 604. To ensure effective tracing of the repair path by source node 602, the source node initiates the "Repair-Path-TTL" value at "1" and increase it by "1" for each subsequent probe.

When discovery probes 622 reaches node 604, it is forwarded to node 606 without any modification to parameters therein, if the decremented MPLS packet's TTL value of "63" is not less than the "Start-DIS" value of "63". As shown in FIG. 6A, upon the source node 602 transmitting discovery probe 622 to node 604, discovery probe 622 is routed along primary FRR path 624 to node 606. The fault discovery process does not start until the TTL in discovery probe 622 is less than 63.

At node 606, since there is no FRR, node 606 also forwards discovery probe 622 to node 608 after decrementing the TTL value to 62. At node 608, the MPLS packet's TTL value is again decremented by 1 to "61" and is now less than "Start-DIS" "63" value. Therefore, at node 608, two new probes are generated (primary probe 630 and repair probe 632).

In one example, primary probe 630 is generated with FRR-Node-Count set to "1" and the value in the "Repair-Path-TTL" being replaced with the current TTL value "61" (after decrementing). Primary probe 630 is then forwarded to node 610.

In one example, repair probe 632 is generated with FRR-Node-Count set to the current TTL value "61" (after decrementing) and the outer packet's TTL with the value in the Repair-Path-TTL field "64". Repair probe 632 is then forwarded to node 618, then to node 620, and finally to node 610 as regular data packet.

Node 610 then forwards primary probe 630 and repair probe 632 received from nodes 608 and 620, respectively, to destination node 612. Thereafter, destination node 612 may modify the MNA option in the received primary probe 630 and repair probe 632 to "End-To-End" option and send the modified primary probe 630 and repair probe 623 back to source node 602.

Figure 7:
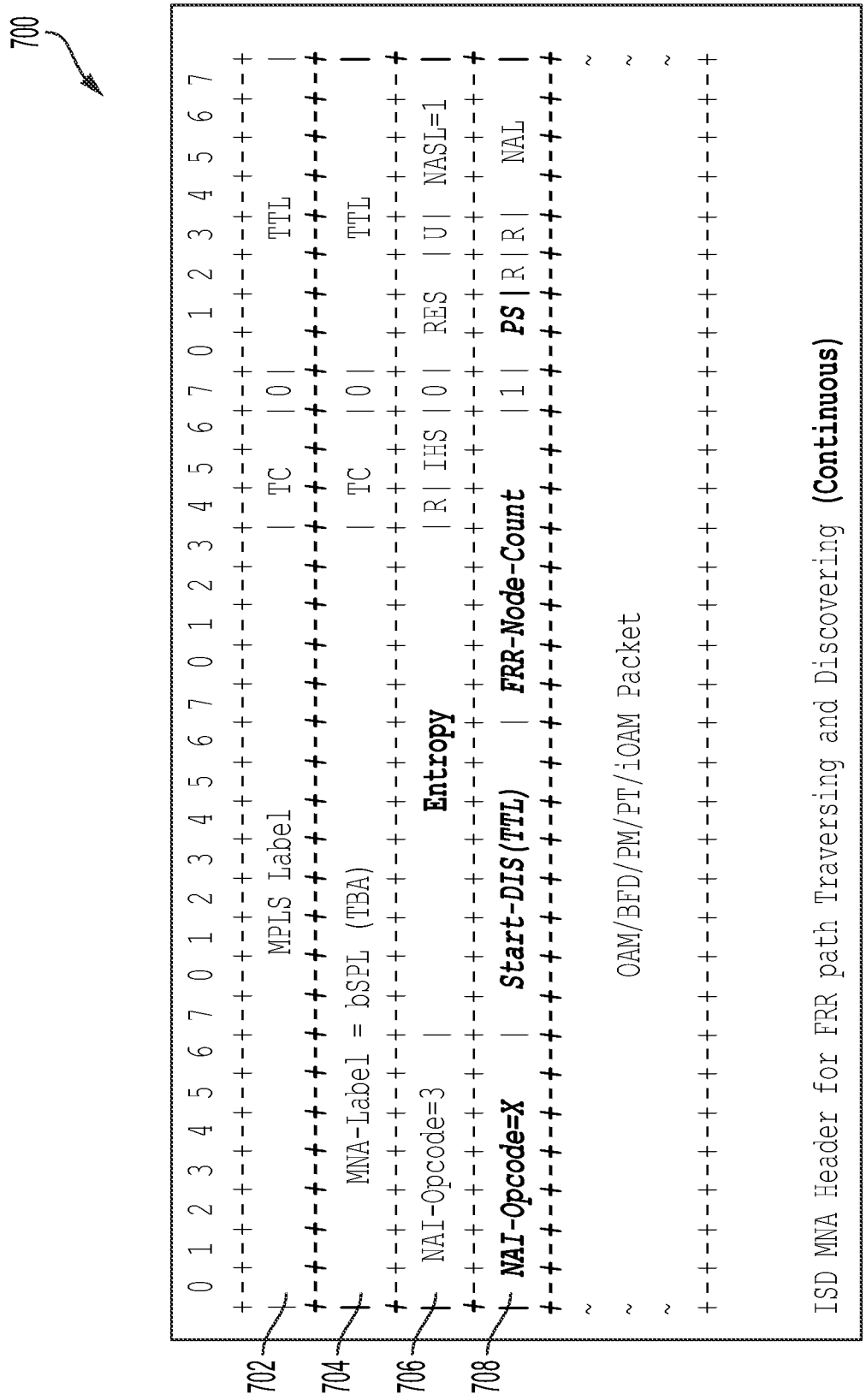
FIG. 7 illustrates an example MPLS Network Action (MNA) header for FRR path traversing and discovery in continuous mode according to some aspects of the present technology.

FIG. 7 illustrates an example MPLS MNA header for FRR path traversing and discovery in continuous mode, according to some aspects of the present technology. The MPLS MNA header 700 can be a header of discovery probe 528 of FIG. 5A and can include an MPLS label 702. The MPLS label 702 can include a short, fixed-length value (e.g., 20 bits), that is assigned to the packet at source node 502. The MPLS label 702 in some examples can represent a forwarding equivalence class (FEC), which is a group of packets that should be treated in the same way within the network. The MPLS MNA header 700 further includes a merge node announcement (MNA) label 704. The MNA label 704 is a label assigned to an alternate path by a merge node identified as being FRR capable. The MNA label is used to guide the packets through the alternate path to reach their destination without traversing the failed portion of the network. The MPLS MNA header 700 further includes a first network access identifier (NAI) opcode 706. The NAI opcode is a field or code within a network protocol message that specifies the type or format of the Network Access Identifier being transmitted. As shown in MPLS MNA header 700, the first NAI Opcode 706 is set to 3.

The MPLS MNA header 700 further includes a second NAI Opcode 708 that is assigned by for FRR path traversing and discovering. The second NAI Opcode 708 includes a "Start-DIS" that allows the source node to start the repair FRR path discovery after a specific node on the path based on the hop count. For example, if the Start-DIS is set to "0", the first FRR discovery starts from the source node. If the Start-DIS is non-zero, the first FRR discovery start when the Start-DIS>TTL. The second NAI Opcode 708 includes a FRR node count that tallies FRR nodes in the path, and a probe state (PS) indicator with a two-bit indication. For example, when the PS indicator is set as 00(D), the probe is in a discovery state. On the other hand, when it is set as 01(P), the probe is in a primary state traversing the primary FRR path. If the FRR is triggered, the probe is dropped. If the PS indicator is 10(R), the probe is in a repair state traversing the primary FRR path. Lastly, if the PS indicator shows 11(RF), the probe is in a repair-FRR-switchover state traversing the primary FRR path.

Figure 8:
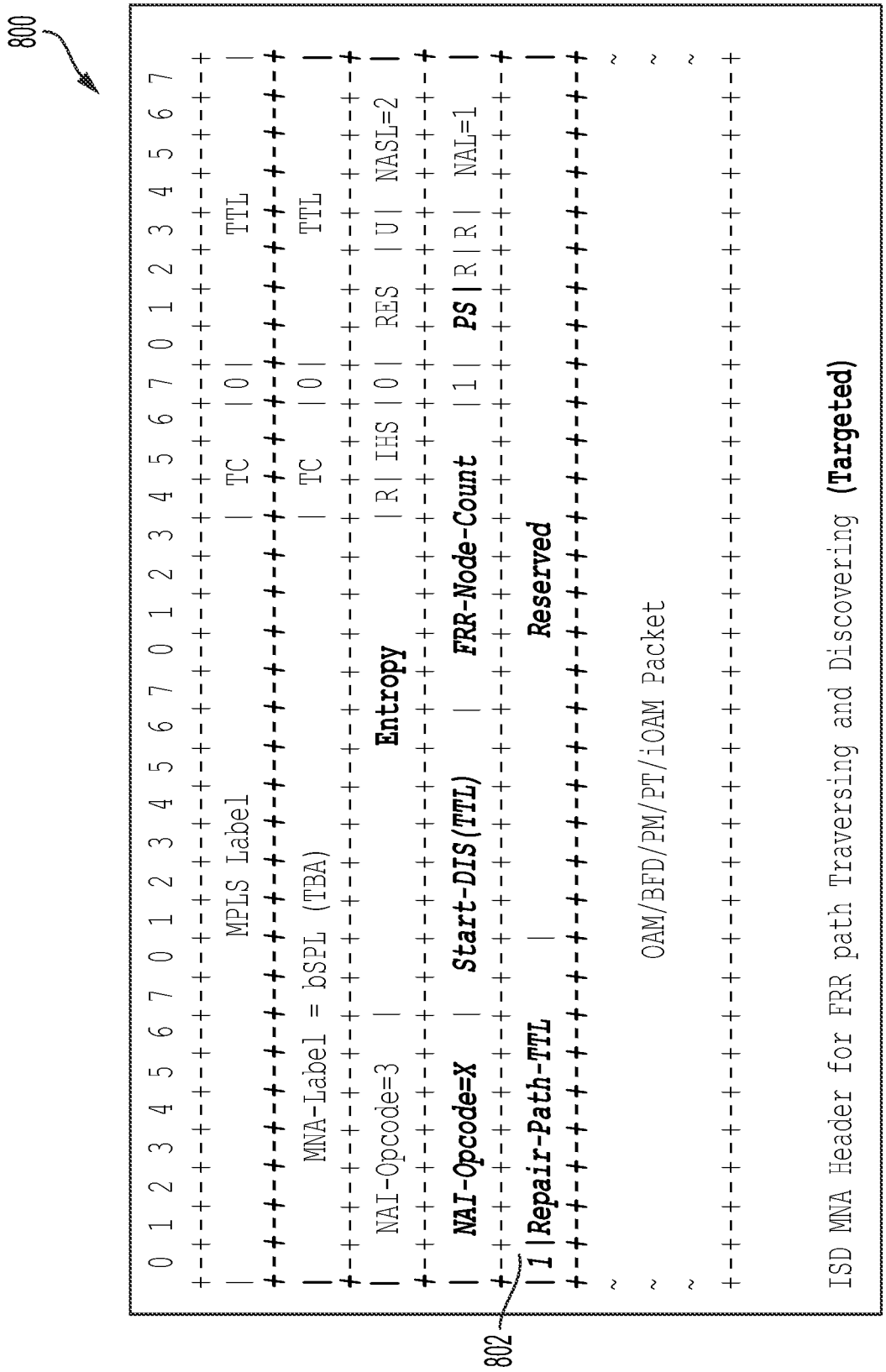
FIG. 8 illustrates an example in-stack-data (ISD) MNA header for FRR path traversing and discovering in the targeted mode according to some aspects of the present technology.

FIG. 8 illustrates an example ISD MNA header for FRR path traversing and discovering in the targeted mode according to some aspects of the present technology. The MPLS MNA header 800 can be a header of discovery probe 622 and may include different components (fields) as discussed above with reference to MPLS MNA header 700 of FIG. 7.

In the targeted mode, the MPLS MNA header 800 can include an additional repair path TTL 802 used to trace the route of the repair path. The repair path TTL 802 is a specific value that indicates the maximum number of hops or network segments that a packet can traverse along the repair path. The repair path TTL is included in the MNA header to ensure that packets follow the correct alternate path while avoiding looping or excessive traversal. As an alternative to using two different opcodes for different modes, a single reserved bit can be used in the repair path TTL 802 field to differentiate between the functionality of each mode.

In another example, the In-Stack Data (ISD) MNA header discussed in FIG. 8, can be used as a Post-Stack Data (PSD) MNA header instead in a continuous mode.

FIG. 9A illustrates an example PSD MNA header for FRR path traversing and discovery in continuous mode, according to some aspects of the present technology. The PSD MNA header can be a header in discovery probe 528 and may include a PSD MNA field 902. The PSD MNA field 902 can include a PS-MNA-Opcode (PS-MNA-OP), a Start-DIS as a TTL value, and an FRR-Node-Count. The PS-MNA-OP field can indicate and specify the type or format of the PSD MNA being transmitted, to provide interpretation information or how to interpret and process the PSD MNA. The Start-DIS is a hop count value that allows the source node to start the repair FRR path discovery from a specific node on the path based on the hop count. The FRR node count, in the case of the primary probe, records the number of FRR nodes in the path. In the case of a repair probe, it records the hop count from where this probe is generated.

Figure 9B:
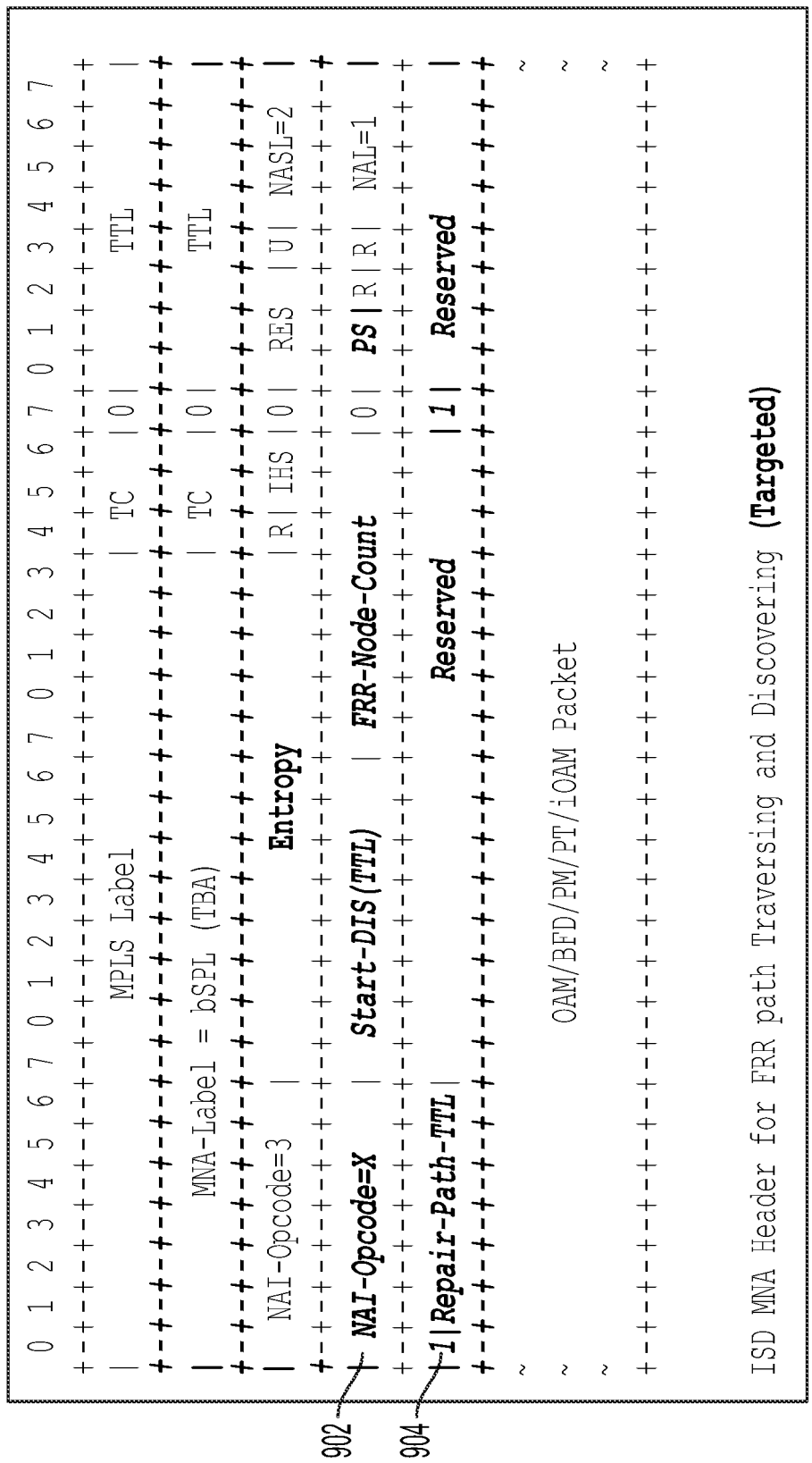
FIG. 9B illustrates an example PSD MNA header for FRR path traversing and discovery in targeted mode according to some aspects of the present technology.

FIG. 9B illustrates an example PSD MNA header for FRR path traversing and discovery in targeted mode, according to some aspects of the present technology. PSD MNA field 902 can be a header of discovery probe 622. In the targeted mode, in addition to the PSD MNA field 902 discussed in FIG. 9A, the PSD MNA header 900 can also include a repair path TTL 904 field. The repair path TTL 904 field is a specific value that is assigned to packets when they are directed along an alternate or repair path during network recovery, such as in MPLS Fast Re-Route (FRR). This repair path TTL 904 field represents the maximum number of network segments, or hops, that the packet is allowed to traverse along the repair path.

Figure 10:
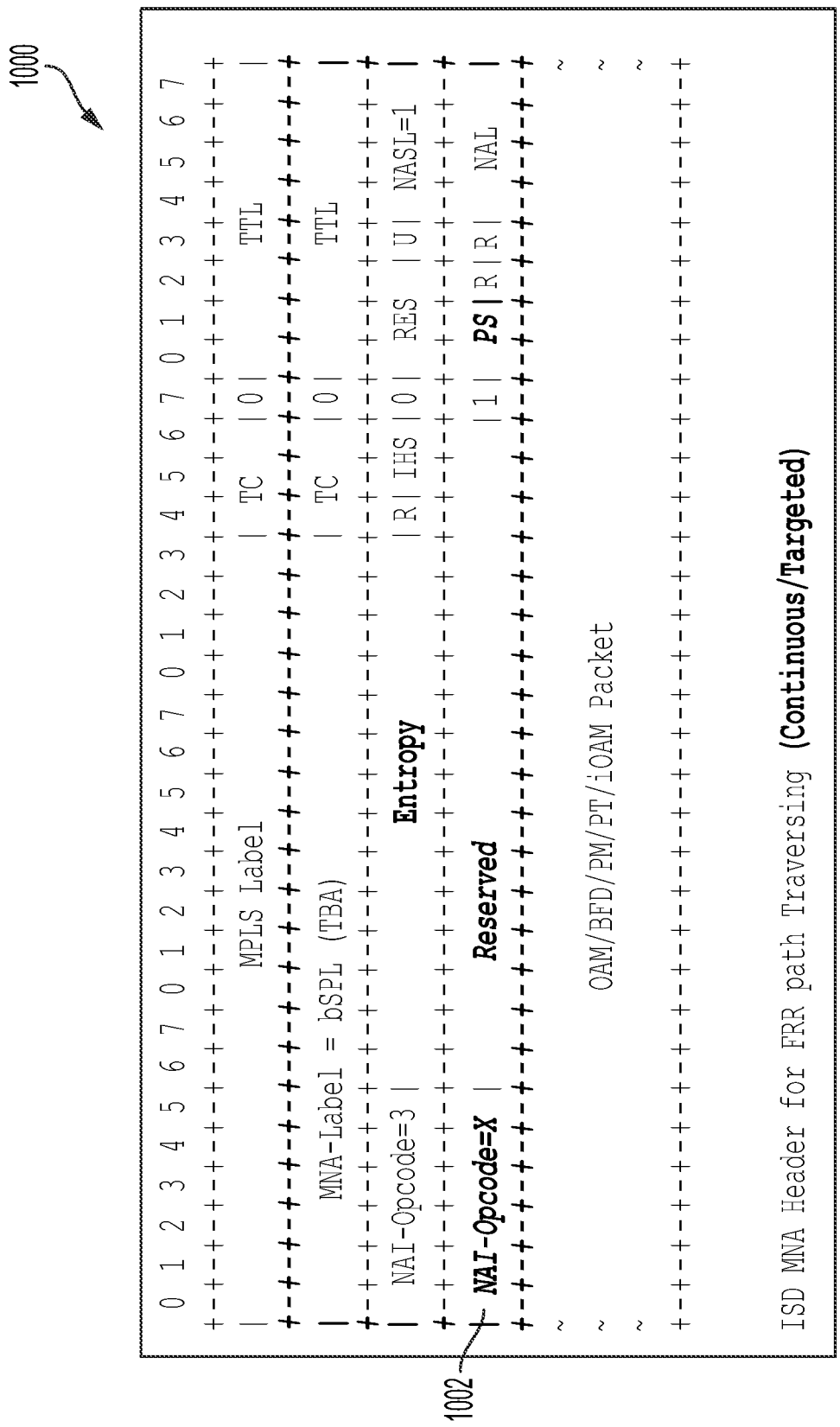
FIG. 10 illustrates an example ISD MNA header 1000 for FRR path traversing in continuous and targeted modes, according to some aspects of the present technology.

FIG. 10 illustrates an example ISD MNA header for FRR path traversing in continuous and targeted modes, according to some aspects of the present technology. ISD MNA header 1000 can be a header in discovery probe 528 and/or discovery probe 622.

In some examples, the ISD MNA header 1000 can utilize the PS value of the second NAI Opcode 1002 field to identify traversal paths during a network failure. The PS value can exclude Start-DIS and FRR-Node-Count, enabling probes to navigate repair paths without gaining further knowledge.

Figure 11A:
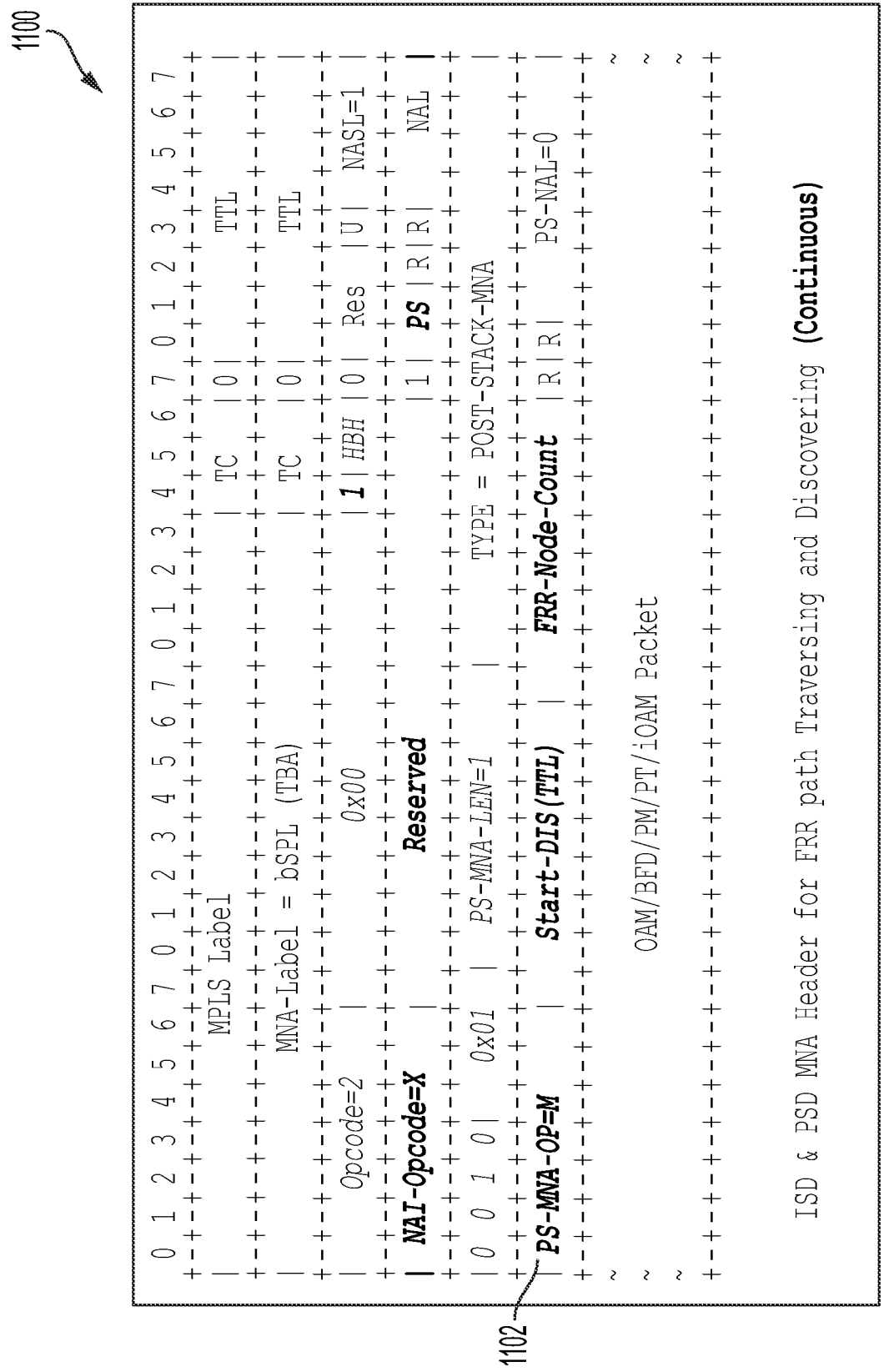
FIG. 11A illustrates an example ISD and PSD MNA header for FRR path traversing and discovering in continuous mode, according to some aspects of the present technology.

FIG. 11A illustrates an example ISD and PSD MNA header for FRR path traversing and discovery in continuous mode, according to some aspects of the present technology. 1100 can be a header in discovery probe 528.

As shown in FIG. 11A, the PS MNA OP 1102 field includes the Start-DIS, and FRR node count. In some examples, the PS could be encoded in the ISD MNA. Accordingly, the "Start-DIS" and "FRR-Node-Count" can be encoded in the PSD MNA in the continuous mode.

Figure 11B:
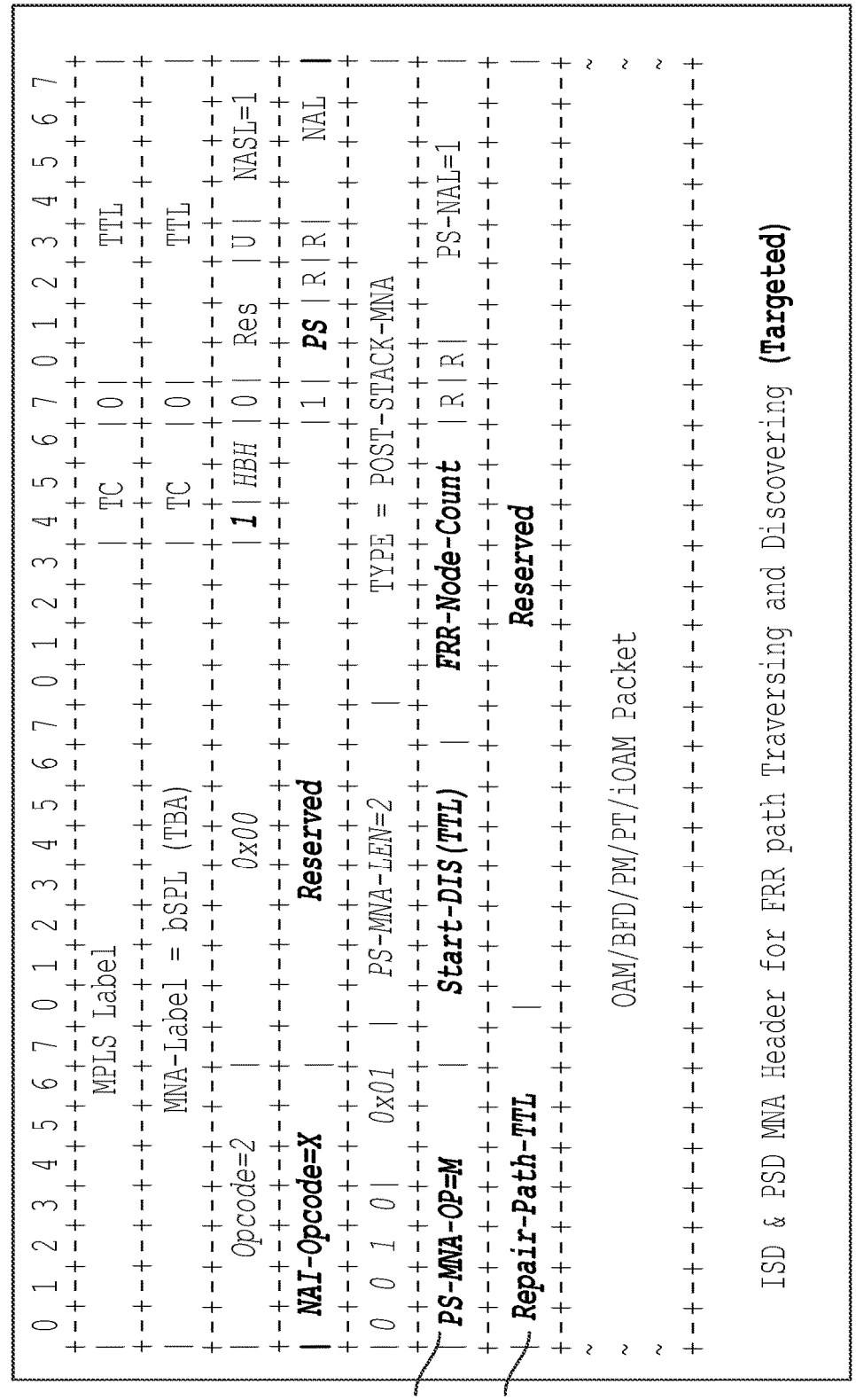
FIG. 11B illustrates an example ISD and PSD MNA header for FRR path traversing and discovering in targeted mode, according to some aspects of the present technology.

FIG. 11B illustrates an example ISD and PSD MNA headers 1106 for FRR path traversing and discovery in targeted mode, according to some aspects of the present technology. ISD and PSD MNA header 1106 can be a header in discovery probe 622.

In another example, as shown in FIG. 11B, the PS can also be encoded in the ISD MNA and the "Start-DIS" and "FRR-Node-Count" could be encoded in the PSD (Post-Stack Data) MNA in targeted mode. Additionally, the Repair Path TTL 1104 value can be indicated as reserved. This indication of "reserved" for the Repair Path TTL 1104 provides the ability to precisely define and govern the maximum number of hops or network segments that packets are allowed to traverse when utilizing the alternate repair path. Such meticulous control is imperative to ensure that packets follow the intended path without the risk of excessive traversal or looping.

When identifying primary FRR paths and repair FRR paths amongst a plurality of nodes in a network, Internet Protocol version 6 (IPv6) data packets are often be utilized to carry routing and delivery information. The IPv6 data packets possess an IPv6 header that is a fixed-length header of 40 bytes in length, which simplifies packet processing and enhances routing efficiency. IPv6 data packets can further include extension headers (e.g., IPv6 Hop-By-Hop and Destination options), which are additional headers that provide various functionalities such as fragmentation, security, mobility, and routing information.

Figure 12A:
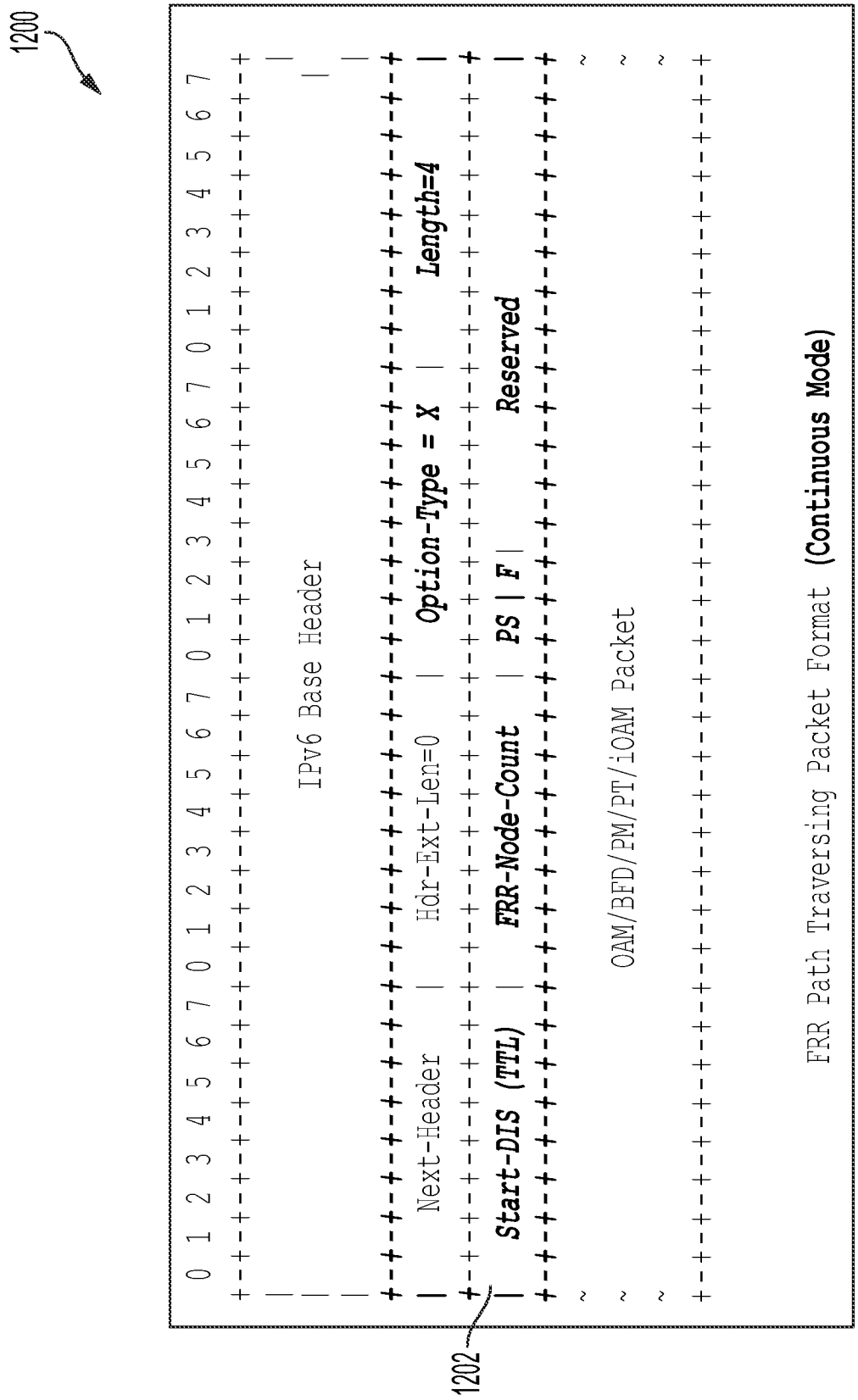
FIG. 12A illustrates an example IPv6 extension header for continuous mode according to some aspects of the present technology.

FIG. 12A illustrates an example IPv6 extension header for FRR path traversing in continuous mode, according to some aspects of the present technology. The IPv6 extension header 1200 can be the header in discovery probe 528. The IPv6 extension header 1200 can include instructions that indicate an order that the fields in the IPv6 header are to be executed. As shown in FIG. 12A, the IPv6 extension header 1200 can include a next header field, a length of the extension header, an option type field, and a specified length. In some examples, IPv6 extension 1202 fields are allocated to carry Start-DIS, FRR-Node-Count, and PS information. To detect the repair path on all ECMP paths from a source node to a destination node, the probe's entropy label for MPLS and flow-label for IPv6 can be varied in another embodiment.

Figure 12B:
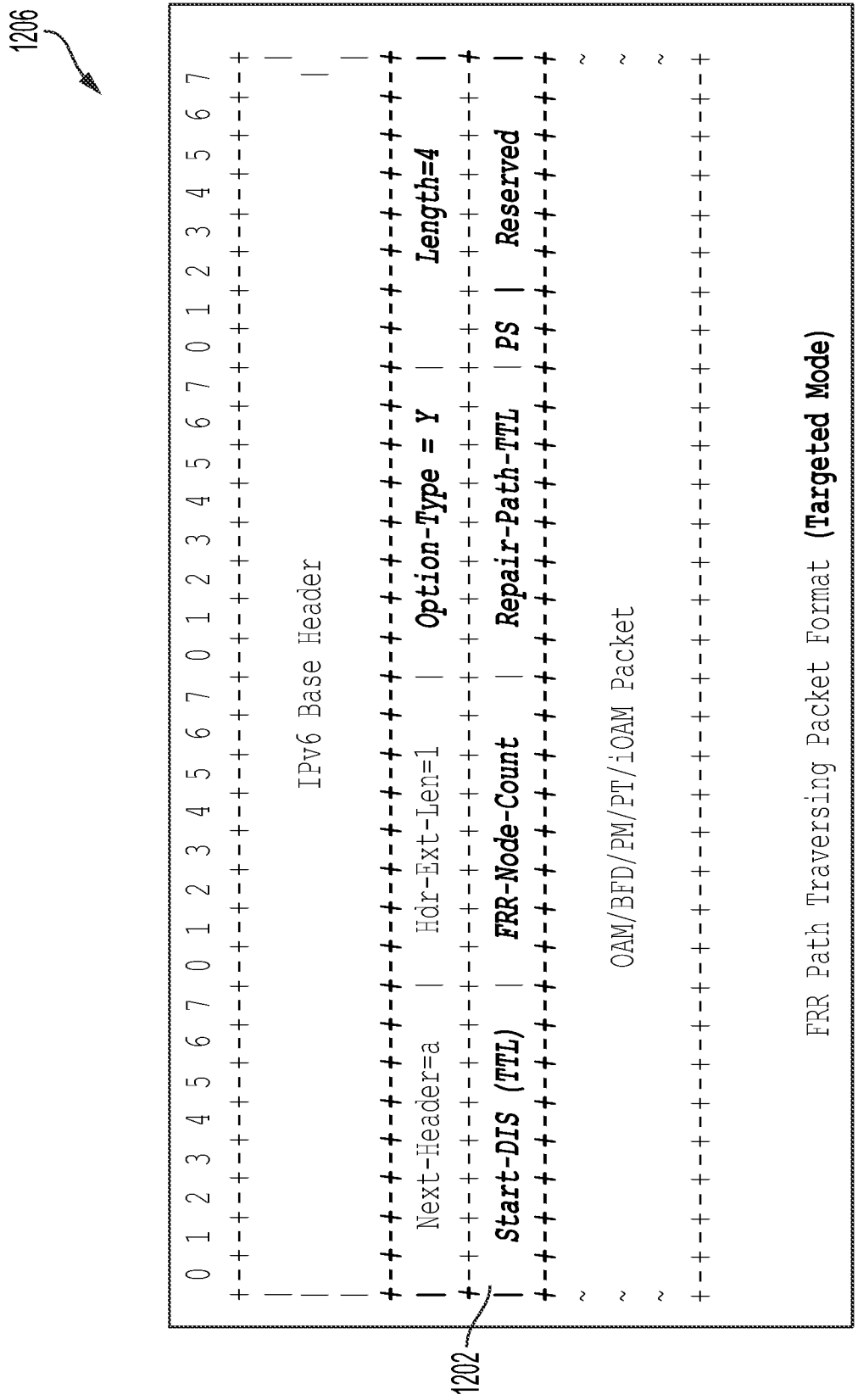
FIG. 12B illustrates an example IPv6 extension header for targeted mode according to some aspects of the present technology.

FIG. 12B illustrates an example IPv6 extension header for targeted mode according to some aspects of the present technology. IPv6 extension header 1206 can be a header in discovery probe 622. As discussed above with regards to FIG. 12A the new IPv6 extension 1202 is allocated to carry "Start-DIS", "FRR-Node-Count", and "Probe-State" information. In accordance with FIG. 12B, an additional copy of the primary probe can be created in its final form. Accordingly, one copy can be sent according to the instructions provided, while the other can be updated with the TTL. This will allow the source node to detect any failures in the backup probe response and use the targeted mode to isolate the problem.

Figure 13:
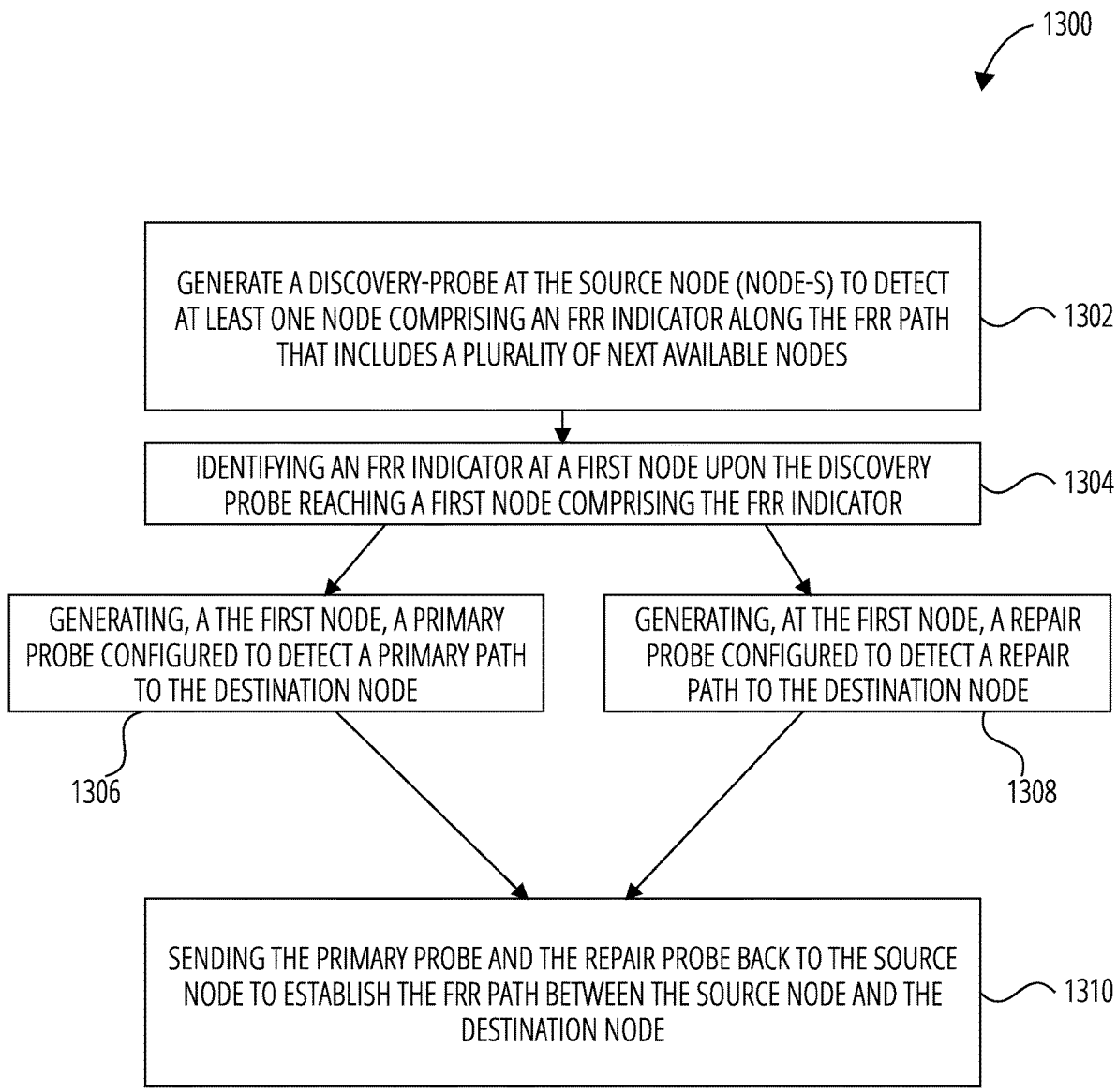
FIG. 13 illustrates an example process for monitoring an FRR path between a source node and a destination node in a network according to some aspects of the present technology.

FIG. 13 illustrates an example process for monitoring a FRR path between a source node and a destination node in a network, according to some aspects of the present technology. Although example process 1300 depicts a particular sequence of operations, the sequence may be altered without departing from the scope of the present disclosure. For example, some of the operations depicted may be performed in parallel or in a different sequence that does not materially affect the function of the process 1300. In other examples, different components of an example device or system that implements the process 1300 may perform functions at substantially the same time or in a specific sequence.

In block 1302, the process 1300 generates a discovery probe from the source node. This probe is used to detect at least one node that has an FRR indicator along the FRR path. The FRR path includes multiple next available nodes. Once the discovery probe reaches the first node that has the FRR indicator, it is forwarded to the remaining next available nodes for repair path discovery along the FRR path. For example, the source node 502 illustrated in FIG. 5A may generate a discovery probe to detect at least one node comprising an FRR indicator along the FRR path that includes a plurality of next available nodes. In some examples, in the continuous mode as illustrated in FIG. 5A-5B, a discovery probe is forwarded to a plurality of next available nodes to initiate a repair path discovery along the FRR path. In some examples, the discovery probe comprises a hop count value. Accordingly, in a targeted mode as illustrated in FIG. 6B, the hop count value can indicate a specific node along the primary FRR path 624 to start the discovery of the second repair FRR path 628 in accordance with the specified hop count value.

In block 1304, the process 1300 includes identifying an FRR indicator at a first node upon the discovery probe reaching a first node comprising the FRR indicator. For example, the discovery probe including the Discovery probe 528 in FIG. 5A can be received by node 504, possessing FRR capability. The discovery probe identifies node 504 as a merge node with FRR capability, indicated by the FRR indicator, allowing it to divert data traffic to a repair FRR path.

In some examples, the discovery probe can continue along the primary FRR path and detect a second node, with FRR capability that includes the ability to divert data traffic to a second repair FRR path during a network failure. For example, the discovery probe can be received by node 508, in FIG. 5B, possessing FRR capability. Node 508 can indicate via a second FRR indicator that there is a first repair FRR first repair path 524 that data traffic can be routed to upon the detection of a network failure.

In some examples, the process 1300 can further include generating a duplicate repair probe to detect a repair path comprising a fourth set of nodes to forward the repair probe towards the destination node. For example, node 508 illustrated in FIG. 5B may generate a duplicate repair probe from the repair probe generated at node 504, to detect a repair path comprising another set of nodes to forward the repair probe toward the destination node.

In block 1306, upon the discovery probe reaching the first node with the FRR indicator, process 1300 includes generating a primary probe configured to detect a primary path comprising a first set of nodes to forward the primary probe toward the destination node. For example, node 504 can generate a primary probe configured to detect a primary FRR path comprising a first set of primary nodes to forward the primary probe toward the destination node.

In block 1308, upon the discovery probe reaching the first node with the FRR indicator, the process 1300 can further include generating a repair probe configured to detect a repair path comprising a second set of nodes to forward the repair probe toward the destination node. For example, node 504 can generate a repair probe (e.g., repair probe 532 or repair probe 632) configured to detect a repair FRR path comprising a first set of repair nodes to forward the primary probe toward the destination node.

In block 1310, process 1300 includes sending the primary probe and the repair probe back to the source node to monitor the FRR path between the source node and the destination node, in response to receiving the primary probe via the primary path and the repair probe via the repair path at the destination node. For example, the destination node 512 illustrated in FIG. 5B may send the primary probe and the repair probe received from node 510 back to the source node 502 to monitor the FRR path, including the primary FRR path 522, and first repair path 524/second repair path 526 between the source node 502 and the destination node 512. In some examples, the monitored FRR path sent to the source node indicates a node value representative of the total number of nodes in the primary path. In some examples, a hop count value indicated where the repair node is generated. In some examples, the discovery probe, the primary probe, and the repair probe are encapsulated within data packets that include a specific header indicating their respective roles and functions within FRR path monitoring.

Figure 14:
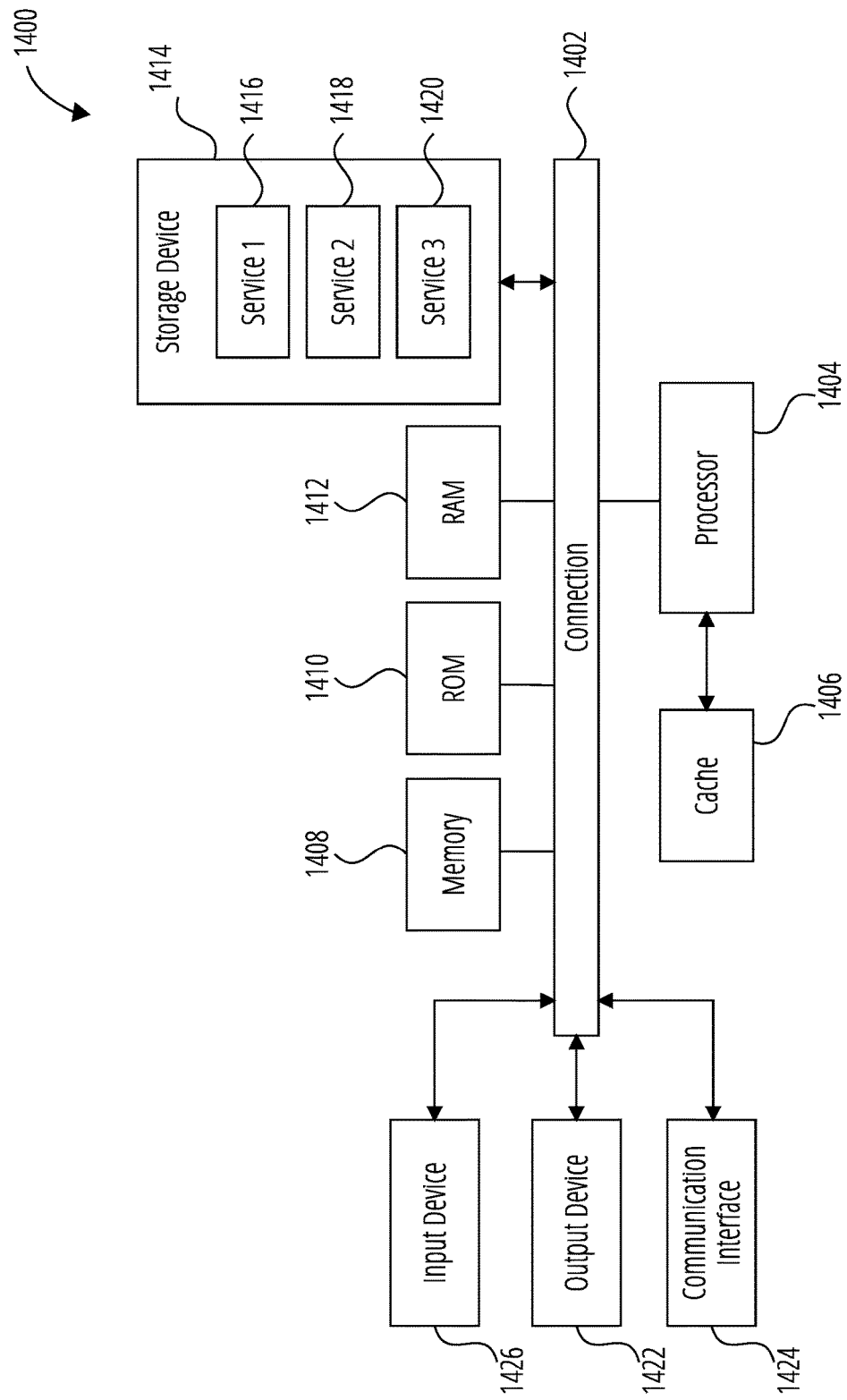
FIG. 14 illustrates an example of a computing system according to some aspects of the present technology.

FIG. 14 illustrates an example of a computing system according to some aspects of the present technology. Example computing system 1400 can be any of the network devices and components described above with reference to FIGS. 1-13 including, but not limited to, source node 502/602, destination node 512/612, any intermediary nodes in FIGS. 5 and 6, etc.

FIG. 14 shows an example of computing system 1400, which can be for example any computing device making up a system network, or any component thereof in which the components of the system are in communication with each other using connection 1402. Connection 1402 can be a physical connection via a bus, or a direct connection into processor 1404, such as in a chipset architecture. Connection 1402 can also be a virtual connection, networked connection, or logical connection.

In some embodiments, computing system 1400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1400 includes at least one processing unit (central processing unit (CPU) or processor) 1404 and connection 1402 that couples various system components including system memory 1408, read-only memory (ROM) 1410, and random-access memory (RAM) 1412 to processor 1404. Computing system 1400 can include a cache of high-speed memory 1408 connected directly with, in close proximity to, or integrated as part of processor 1404.

Processor 1404 can include any general-purpose processor and a hardware service or software service, such as services 1416, 1418, and 1420 stored in storage device 1414, configured to control processor 1404 as well as a special-purpose processor where software instructions are incorporated into the actual processor design. Processor 1404 may essentially be a completely self-contained computing system, containing multiple cores or processors, a bus, memory controller, cache, etc. A multi-core processor may be symmetric or asymmetric.

To enable user interaction, computing system 1400 includes an input device 1426, which can represent any number of input mechanisms, such as a microphone for speech, a touch-sensitive screen for gesture or graphical input, keyboard, mouse, motion input, speech, etc. Computing system 1400 can also include output device 1422, which can be one or more of a number of output mechanisms known to those of skill in the art. In some instances, multimodal systems can enable a user to provide multiple types of input/output to communicate with computing system 1400. Computing system 1400 can include communication interface 1424, which can generally govern and manage the user input and system output. There is no restriction on operating on any particular hardware arrangement, and therefore the basic features here may easily be substituted for improved hardware or firmware arrangements as they are developed.

Storage device 1414 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1414 can include software services, servers, services, etc., that when the code that defines such software is executed by the processor 1404, it causes the system to perform a function. In some embodiments, a hardware service that performs a particular function can include the software component stored in a computer-readable medium in connection with the hardware components, such as processor 1404, connection 1402, output device 1422, etc., to carry out the function.

For clarity of explanation, in some instances, the present technology may be presented as including individual functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in the memory of a client device and/or one or more servers of a content management system and performs one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data that cause or otherwise configure a general-purpose computer, special-purpose computer, or special-purpose processing device to perform a certain function or group of functions. Portions of computer resources used can be accessible over a network. The computer-executable instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein can also be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Some aspects of the present technology include:

Clause 1. A method for monitoring a fast re-route (FRR) path between a source node (node-s) and a destination node (node-e) in a network, comprising the steps of: generating a discovery-probe at the source node (node-s) to detect at least one node comprising an FRR indicator along the FRR path that includes a plurality of next available nodes, wherein the discovery probe is forwarded to the plurality of next available nodes to initiate a repair path discovery along the FRR path; upon the discovery probe reaching a first node with the FRR indicator, generating: a primary probe configured to detect a primary path comprising a first set of nodes to forward the primary probe towards the destination node; and a repair probe configured to detect a repair path comprising a second set of nodes to forward the repair probe towards the destination node; and in response to receiving the primary probe via the primary path and the repair probe via the repair path at the destination node, sending the primary probe and the repair probe back to the source node to monitor the FRR path between the source node and the destination node.

Clause 2. The method of clause 1, further comprising: identifying a second node along the FRR path that includes a second repair path, wherein the second node does not include the FRR indicator; and forwarding the discovery probe to the next available node, wherein the discovery probe bypasses the second repair path.

Clause 3. The method of clause 1, further comprising: identifying a second node along the primary path that includes a second FRR indicator, wherein the second node is configured to: generate a duplicate primary probe to detect the primary path comprising a third set of nodes to forward the duplicate primary probe towards the destination node; and generate a duplicate repair probe to detect a repair path comprising a fourth set of nodes to forward the repair probe towards the destination node.

Clause 4. The method of clause 1, wherein the discovery probe comprises a hop count value, wherein the hop count value indicates a specific node along the FRR path to start discovery of the repair path.

Clause 5. The method of clause 1, wherein the monitored FRR path sent to the source node indicates a node value representative of a total number of nodes in the primary path, and a hop count value indicated where the repair node is generated.

Clause 6. The method of clause 1, wherein the discovery probe, the primary probe, and the repair probe are encapsulated within data packets that include a specific header indicating their respective roles and functions within the FRR path monitoring process.

Clause 7. The method of clause 1, further comprising: triggering an FRR switchover process based on network conditions and performance metrics, wherein in response to the FRR switchover being triggered, the second probe is configured to generate a repair FRR Switchover Probe and send it along the repair path instead of the repair probe, to expedite the monitoring of the repair path and ensure network resiliency during FRR switchover events.

Clause 8. A network device comprising: one or more memories having computer-readable instructions stored therein; and one or more processors configured to execute the computer-readable instructions to: generate a discovery-probe at the source node (node-s) to detect at least one node comprising an FRR indicator along the FRR path that includes a plurality of next available nodes, wherein the discovery probe is forwarded to the plurality of next available nodes to initiate a repair path discovery along the FRR path; upon the discovery probe reach a first node with the FRR indicator, generating: a primary probe configured to detect a primary path comprising a first set of nodes to forward the primary probe towards the destination node; and a repair probe configured to detect a repair path comprising a second set of nodes to forward the repair probe towards the destination node; and in response to receiving the primary probe via the primary path and the repair probe via the repair path at the destination node, send the primary probe and the repair probe back to the source node to monitor the FRR path between the source node and the destination node.

Clause 9. The network device of clause 8, further comprising: identifying a second node along the FRR path that includes a second repair path, wherein the second node does not include the FRR indicator; and forwarding the discovery probe to the next available node, wherein the discovery probe bypasses the second repair path.

Clause 10. The network device of clause 8, further comprising: identifying a second node along the primary path that includes a second FRR indicator, wherein the second node is configured to: generate a duplicate primary probe to detect the primary path comprising a third set of nodes to forward the duplicate primary probe towards the destination node; and generate a duplicate repair probe to detect a repair path comprising a fourth set of nodes to forward the repair probe towards the destination node.

Clause 11. The network device of clause 8, wherein the discovery probe comprises a hop count value, wherein the hop count value indicates a specific node along the FRR path to start discovery of the repair path.

Clause 12. The network device of clause 8, wherein the monitored FRR path sent to the source node indicates a node value representative of a total number of nodes in the primary path, and a hop count value indicated where the repair node is generated.

Clause 13. The network device of clause 8, wherein the discovery probe, the primary probe, and the repair probe are encapsulated within data packets that include a specific header indicating their respective roles and functions within the FRR path monitoring process.

Clause 14. The network device of clause 8, further comprising: triggering an FRR switchover process based on network conditions and performance metrics, wherein in response to the FRR switchover being triggered, the second probe is configured to generate a repair FRR Switchover Probe and send it along the repair path instead of the repair probe, to expedite the monitoring of the repair path and ensure network resiliency during FRR switchover events.

Clause 15. One or more non-transitory computer-readable storage media comprising computer-readable instructions, which when executed by one or more processors of a network appliance, cause the network appliance to: generate a discovery-probe at the source node (node-s) to detect at least one node comprising an FRR indicator along the FRR path that includes a plurality of next available nodes, wherein the discovery probe is forwarded to the plurality of next available nodes to initiate a repair path discovery along the FRR path; upon the discovery probe reach a first node with the FRR indicator, generating: a primary probe configured to detect a primary path comprising a first set of nodes to forward the primary probe towards the destination node; and a repair probe configured to detect a repair path comprising a second set of nodes to forward the repair probe towards the destination node; and in response to receiving the primary probe via the primary path and the repair probe via the repair path at the destination node, send the primary probe and the repair probe back to the source node to monitor the FRR path between the source node and the destination node.

Clause 16. The one or more non-transitory computer-readable storage media of clause 15, wherein the one or more processors are further configured to: identifying a second node along the FRR path that includes a second repair path, wherein the second node does not include the FRR indicator; and forwarding the discovery probe to the next available node, wherein the discovery probe bypasses the second repair path.

Clause 17. The one or more non-transitory computer-readable storage media of clause 15, wherein the one or more processors are further configured to: generate a duplicate primary probe to detect the primary path comprising a third set of nodes to forward the duplicate primary probe towards the destination node; and generate a duplicate repair probe to detect a repair path comprising a fourth set of nodes to forward the repair probe towards the destination node.

Clause 18. The one or more non-transitory computer-readable storage media of clause 15, wherein the discovery probe comprises a hop count value, wherein the hop count value indicates a specific node along the FRR path to start discovery of the repair path.

Clause 19. The one or more non-transitory computer-readable storage media of clause 15, wherein the monitored FRR path sent to the source node indicates a node value representative of a total number of nodes in the primary path, and a hop count value indicated where the repair node is generated.

Clause 20. The one or more non-transitory computer-readable storage media of clause 15, wherein the discovery probe, the primary probe, and the repair probe are encapsulated within data packets that include a specific header indicating their respective roles and functions within the FRR path monitoring process.

What is claimed is:

1. A method for monitoring a Fast Re-Route (FRR) path between a source node (Node-S) and a destination node (Node-E) in a network, comprising:
    generating a discovery probe at the source node (Node-S) to detect at least one node with an FRR indicator along the FRR path that includes a plurality of next available nodes, wherein the discovery probe is forwarded to the plurality of next available nodes to initiate a repair path discovery along the FRR path;
    upon the discovery probe reaching a first node with the FRR indicator, generating:
        a primary probe configured to detect a primary path comprising a first set of nodes to forward the primary probe towards the destination node; and
        a repair probe configured to detect a repair path comprising a second set of nodes to forward the repair probe towards the destination node; and
    in response to receiving the primary probe via the primary path and the repair probe via the repair path at the destination node, sending the primary probe and the repair probe back to the source node to monitor the FRR path between the source node and the destination node, wherein the monitored FRR path sent to the source node indicates a node value representative of a total number of nodes in the primary path, and a hop count value indicated where the repair probe is generated.

2. The method of claim 1, further comprising:
    identifying a second node along the FRR path that includes a second repair path, wherein the second node does not include the FRR indicator; and
    forwarding the discovery probe to a next available node, wherein the discovery probe bypasses the second repair path.

3. The method of claim 1, further comprising:
    identifying a second node along the primary path that includes a second FRR indicator, wherein the second node is configured to:
        generate a duplicate primary probe to detect the primary path comprising a third set of nodes to forward the duplicate primary probe towards the destination node; and
        generate a duplicate repair probe to detect the repair path comprising a fourth set of nodes to forward the repair probe towards the destination node.

4. The method of claim 1, wherein the discovery probe comprises the hop count value, wherein the hop count value indicates a specific node along the FRR path to start discovery of the repair path.

5. The method of claim 1, wherein the discovery probe, the primary probe, and the repair probe are encapsulated within data packets that include a header indicating their respective roles and functions within the FRR path monitoring.

6. The method of claim 1, further comprising:
    triggering an FRR switchover process based on network conditions and performance metrics, wherein in response to the FRR switchover process being triggered, the repair probe is configured to generate a repair FRR Switchover Probe and send it along the repair path instead of the repair probe, to expedite monitoring of the repair path and ensure network resiliency during FRR switchover events.

7. A network device comprising:
    one or more memories having computer-readable instructions stored therein; and
    one or more processors configured to execute the computer-readable instructions to:
        generate a discovery probe at a source node (Node-S) to detect at least one node with a Fast Re-Route (FRR) indicator along an FRR path that includes a plurality of next available nodes, wherein the discovery probe is forwarded to the plurality of next available nodes to initiate a repair path discovery along the FRR path;
        upon the discovery probe reach a first node with the FRR indicator, generate:
            a primary probe configured to detect a primary path comprising a first set of nodes to forward the primary probe towards a destination node; and
            a repair probe configured to detect a repair path comprising a second set of nodes to forward the repair probe towards the destination node; and
        in response to receiving the primary probe via the primary path and the repair probe via the repair path at the destination node, send the primary probe and the repair probe back to the source node to monitor the FRR path between the source node and the destination node, wherein the monitored FRR path sent to the source node indicates a node value representative of a total number of nodes in the primary path, and a hop count value indicated where the repair probe is generated.

8. The network device of claim 7, wherein the one or more processors are further configured to execute the computer-readable instructions to:
    identify a second node along the FRR path that includes a second repair path, wherein the second node does not include the FRR indicator; and
    forward the discovery probe to a next available node, wherein the discovery probe bypasses the second repair path.

9. The network device of claim 7, wherein the one or more processors are further configured to execute the computer-readable instructions to:

identify a second node along the primary path that includes a second FRR indicator, wherein the second node is configured to:
  generate a duplicate primary probe to detect the primary path comprising a third set of nodes to forward the duplicate primary probe towards the destination node; and
  generate a duplicate repair probe to detect the repair path comprising a fourth set of nodes to forward the repair probe towards the destination node.

10. The network device of claim 7, wherein the discovery probe comprises the hop count value, wherein the hop count value indicates a specific node along the FRR path to start discovery of the repair path.

11. The network device of claim 7, wherein the discovery probe, the primary probe, and the repair probe are encapsulated within data packets that include a specific header indicating their respective roles and functions within the FRR path monitoring.

12. The network device of claim 7, wherein the one or more processors are further configured to execute the computer-readable instructions to:
  trigger an FRR switchover process based on network conditions and performance metrics, wherein in response to the FRR switchover process being triggered, the repair probe is configured to generate a repair FRR Switchover Probe and send it along the repair path instead of the repair probe, to expedite monitoring of the repair path and ensure network resiliency during FRR switchover events.

13. One or more non-transitory computer-readable storage media comprising computer-readable instructions, which when executed by one or more processors of a network device, cause the network device to:
  generate a discovery probe at a source node (Node-S) to detect at least one node with a Fast Re-Route (FRR) indicator along an FRR path that includes a plurality of next available nodes, wherein the discovery probe is forwarded to the plurality of next available nodes to initiate a repair path discovery along the FRR path;
  upon the discovery probe reach a first node with the FRR indicator, generate:
  a primary probe configured to detect a primary path comprising a first set of nodes to forward the primary probe towards a destination node; and
  a repair probe configured to detect a repair path comprising a second set of nodes to forward the repair probe towards the destination node; and
  in response to receiving the primary probe via the primary path and the repair probe via the repair path at the destination node, send the primary probe and the repair probe back to the source node to monitor the FRR path between the source node and the destination node, wherein the monitored FRR path sent to the source node indicates a node value representative of a total number of nodes in the primary path, and a hop count value indicated where the repair probe is generated.

14. The one or more non-transitory computer-readable storage media of claim 13, wherein the instructions executed by the one or more processors further cause the network device to:
  identify a second node along the FRR path that includes a second repair path, wherein the second node does not include the FRR indicator; and
  forward the discovery probe to a next available node, wherein the discovery probe bypasses the second repair path.

15. The one or more non-transitory computer-readable storage media of claim 13, wherein the instructions executed by the one or more processors further cause the network device to:
  generate a duplicate primary probe to detect the primary path comprising a third set of nodes to forward the duplicate primary probe towards the destination node; and
  generate a duplicate repair probe to detect a repair path comprising a fourth set of nodes to forward the repair probe towards the destination node.

16. The one or more non-transitory computer-readable storage media of claim 13, wherein the discovery probe comprises the hop count value, wherein the hop count value indicates a specific node along the FRR path to start discovery of the repair path.

17. The one or more non-transitory computer-readable storage media of claim 13, wherein the discovery probe, the primary probe, and the repair probe are encapsulated within data packets that include a specific header indicating their respective roles and functions within the FRR path monitoring.

* * * * *